United States Patent
Inagaki

(10) Patent No.: US 11,533,422 B2
(45) Date of Patent: Dec. 20, 2022

(54) APPARATUS, IMAGE CAPTURING APPARATUS, METHOD, AND STORAGE MEDIUM FOR PERFORMING SHOOTING CONTROL

(71) Applicant: CANON KABUSHIKI KAISHA, Tokyo (JP)

(72) Inventor: Yu Inagaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/308,491

(22) Filed: May 5, 2021

(65) Prior Publication Data
US 2021/0360165 A1    Nov. 18, 2021

(30) Foreign Application Priority Data
May 13, 2020    (JP) .............................. JP2020-084791

(51) Int. Cl.
*H04N 5/232*    (2006.01)
(52) U.S. Cl.
CPC . *H04N 5/232121* (2018.08); *H04N 5/232127* (2018.08)
(58) Field of Classification Search
None
See application file for complete search history.

(56) References Cited

U.S. PATENT DOCUMENTS

| | | | | |
|---|---|---|---|---|
| 2005/0189419 A1* | 9/2005 | Igarashi | ........... | H04N 5/232127 348/E5.045 |
| 2006/0115157 A1* | 6/2006 | Mori | .................... | G06V 40/174 382/118 |
| 2006/0165402 A1* | 7/2006 | Ishii | ................. | H04N 5/232127 348/E5.045 |
| 2007/0269196 A1* | 11/2007 | Misawa | ........... | H04N 5/232127 396/123 |
| 2008/0187187 A1* | 8/2008 | Tezuka | ................. | G06V 40/161 382/118 |
| 2008/0278589 A1* | 11/2008 | Thorn | .............. | H04N 5/232123 348/208.99 |
| 2009/0091633 A1* | 4/2009 | Tamaru | .............. | H04N 5/23219 348/208.14 |

(Continued)

FOREIGN PATENT DOCUMENTS

JP        2009192774 A    8/2009

*Primary Examiner* — Twyler L Haskins
*Assistant Examiner* — Dwight Alex C Tejano
(74) *Attorney, Agent, or Firm* — Canon U.S.A., Inc. IP Division

(57) ABSTRACT

A detection unit detects a subject area that partially includes a subject to be detected in a shooting range. An obtainment unit obtains a plurality of defocus amounts corresponding to a plurality of ranging points inside a ranging area that includes the subject area. A categorization unit categorizes the ranging area into a plurality of partial areas based on the plurality of defocus amounts. Each of the plurality of partial areas corresponds to a different one of partial ranges in a range of the plurality of defocus amounts. A control unit performs shooting control based on the plurality of partial areas. The shooting control is performed so that a contribution of a partial area with a first subject degree is larger than a contribution of a partial area with a second subject degree that is lower than the first subject degree.

21 Claims, 15 Drawing Sheets

(56) References Cited

U.S. PATENT DOCUMENTS

| | | | |
|---|---|---|---|
| 2009/0207298 A1* | 8/2009 | Kawanishi | H04N 5/232123 348/E5.042 |
| 2012/0044400 A1* | 2/2012 | Okada | H04N 5/23232 348/E5.045 |
| 2012/0057786 A1* | 3/2012 | Yano | H04N 5/232945 382/170 |
| 2012/0300083 A1* | 11/2012 | Funamoto | G02B 27/0093 348/169 |
| 2013/0044234 A1* | 2/2013 | Nagano | H04N 5/232212 348/222.1 |
| 2015/0227023 A1* | 8/2015 | Hamano | H04N 5/232123 348/169 |
| 2015/0365587 A1* | 12/2015 | Ha | H04N 5/232945 715/721 |
| 2017/0034421 A1* | 2/2017 | Yamazaki | H04N 5/232945 |

* cited by examiner

PLAN VIEW a-a CROSS-SECTIONAL VIEW

APPARATUS, IMAGE CAPTURING APPARATUS, METHOD, AND STORAGE MEDIUM FOR PERFORMING SHOOTING CONTROL

BACKGROUND OF THE DISCLOSURE

Field of the Disclosure

The aspect of the embodiments relates to an apparatus, an image capturing apparatus, a method, and a storage medium.

Description of the Related Art

There is a conventionally known method of performing focus adjustment by detecting a subject and performing ranging computation in a detected section. With the technique of Japanese Patent Laid-Open No. 2009-192774, optimal ranging that suits a subject can be performed by determining a detection direction of a focus detection signal in accordance with a detected location of a subject.

In general subject detection processing, an area in which a subject to be detected exists and an area in which the subject does not exist are not strictly distinguished from each other, and an area that also includes an area in which the subject to be detected does not exist (e.g., a background area) is detected as a subject area. Therefore, for example, even when focus adjustment (focus control) has been performed based on a subject area, there is a possibility that an area in which a subject to be detected does not exist (e.g., a background area) is brought into focus. In this regard, the same goes for a case where shooting control other than focus control (e.g., exposure control) is performed; even when shooting control has been performed based on a subject area, it is not necessarily the case that a control result appropriate for a subject to be detected is obtained.

SUMMARY OF THE DISCLOSURE

According to a first aspect of the embodiments, there is provided an apparatus, comprising: a detection unit configured to detect a subject area that partially includes a subject to be detected in a shooting range; an obtainment unit configured to obtain a plurality of defocus amounts corresponding to a plurality of ranging points inside a ranging area that includes the subject area; a categorization unit configured to categorize the ranging area into a plurality of partial areas based on the plurality of defocus amounts, each of the plurality of partial areas corresponding to a different one of partial ranges in a range of the plurality of defocus amounts; a determination unit configured to determine a subject degree with respect to each of the plurality of partial areas based on geometric relationships between each of the plurality of partial areas and the subject area, the subject degree indicating a possibility that the subject to be detected exists; and a control unit configured to perform shooting control based on the plurality of partial areas, the shooting control being performed so that a contribution of a partial area with a first subject degree is larger than a contribution of a partial area with a second subject degree that is lower than the first subject degree.

According to a second aspect of the embodiments, there is provided an image capturing apparatus, comprising: the apparatus according the first aspect; and an image capturing unit.

According to a third aspect of the embodiments, there is provided a method executed by an apparatus, comprising: detecting a subject area that partially includes a subject to be detected in a shooting range; obtaining a plurality of defocus amounts corresponding to a plurality of ranging points inside a ranging area that includes the subject area; categorizing the ranging area into a plurality of partial areas based on the plurality of defocus amounts, each of the plurality of partial areas corresponding to a different one of partial ranges in a range of the plurality of defocus amounts; determining a subject degree with respect to each of the plurality of partial areas based on geometric relationships between each of the plurality of partial areas and the subject area, the subject degree indicating a possibility that the subject to be detected exists; and performing shooting control based on the plurality of partial areas, the shooting control being performed so that a contribution of a partial area with a first subject degree is larger than a contribution of a partial area with a second subject degree that is lower than the first subject degree.

According to a fourth aspect of the embodiments, there is provided a non-transitory computer-readable storage medium which stores a program for causing a computer to execute a method comprising: detecting a subject area that partially includes a subject to be detected in a shooting range; obtaining a plurality of defocus amounts corresponding to a plurality of ranging points inside a ranging area that includes the subject area; categorizing the ranging area into a plurality of partial areas based on the plurality of defocus amounts, each of the plurality of partial areas corresponding to a different one of partial ranges in a range of the plurality of defocus amounts; determining a subject degree with respect to each of the plurality of partial areas based on geometric relationships between each of the plurality of partial areas and the subject area, the subject degree indicating a possibility that the subject to be detected exists; and performing shooting control based on the plurality of partial areas, the shooting control being performed so that a contribution of a partial area with a first subject degree is larger than a contribution of a partial area with a second subject degree that is lower than the first subject degree.

Further features of the disclosure will become apparent from the following description of exemplary embodiments with reference to the attached drawings.

DESCRIPTION OF THE EMBODIMENTS

Figure 1:
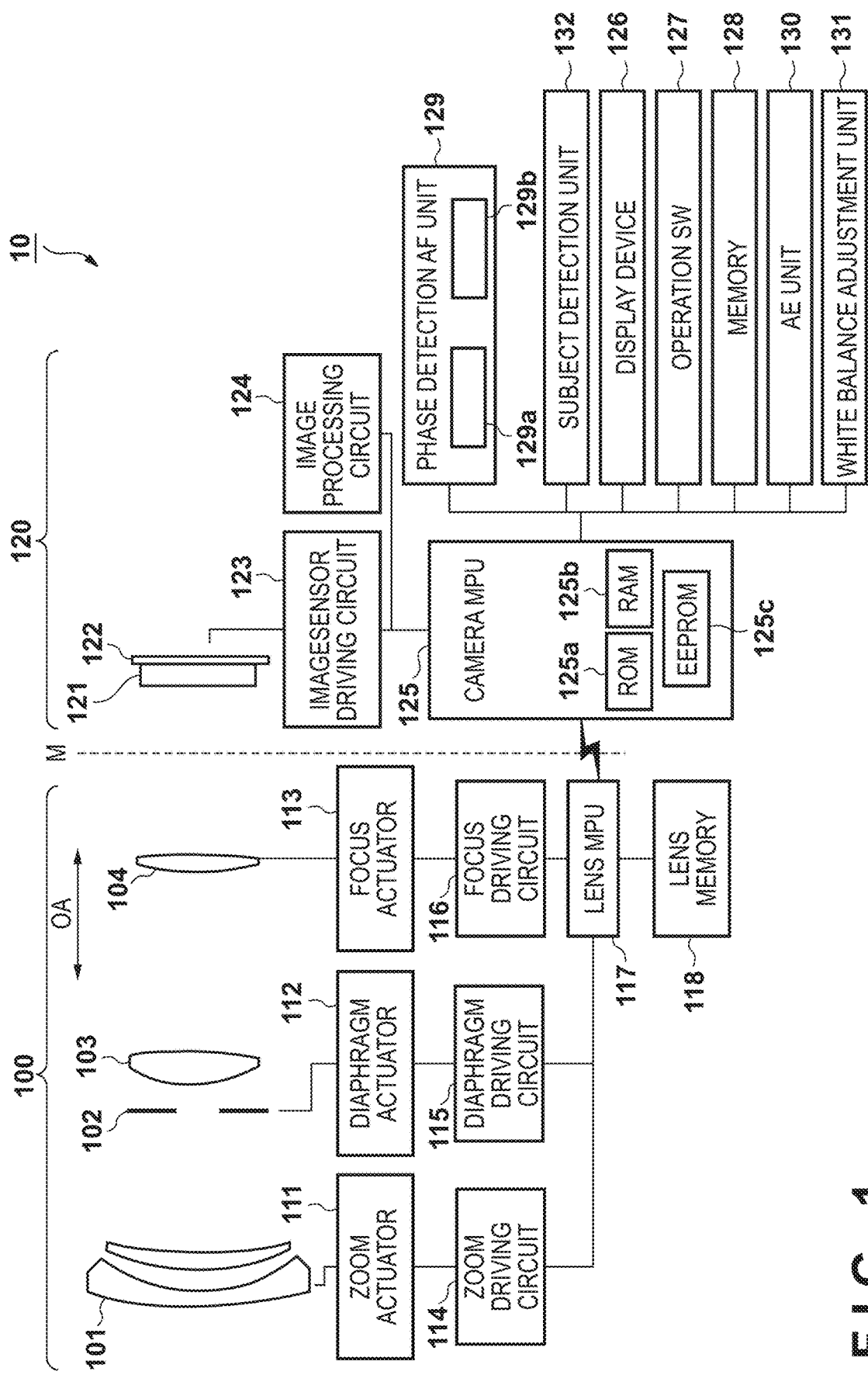
FIG. 1 is a block diagram showing a configuration of an image capturing apparatus 10 that includes an image capturing control apparatus.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Configuration of Image Capturing Apparatus 10

FIG. 1 is a block diagram showing a configuration of an image capturing apparatus 10 that includes an image capturing control apparatus. In an example of FIG. 1, the image capturing apparatus 10 is a single-lens reflex digital camera that allows a lens to be exchanged. The image capturing apparatus 10 is in the form of a camera system that includes a lens unit 100 (interchangeable lens) and a camera main body 120. The lens unit 100 is removably attached to the camera main body 120 via a mount M indicated by a dash line in FIG. 1. However, the present embodiment is not limited to the configuration shown in FIG. 1, and is also applicable to an image capturing apparatus (digital camera) in which a lens unit (image capturing optical system) and a camera main body are integrally configured. Furthermore, the present embodiment is not limited to a digital camera, and is also applicable to other image capturing apparatuses, such as a video camera.

The lens unit 100 includes a first lens assembly 101, a diaphragm 102, a second lens assembly 103, and a focus lens assembly (hereinafter simply referred to as "focus lens") 104 as an optical system, and a driving/control system. Thus, the lens unit 100 is a shooting lens (image capturing optical system) that includes the focus lens 104 and forms a subject image.

The first lens assembly 101 is disposed at a front end of the lens unit 100, and is held in such a manner that it can advance and recede in an optical axis direction OA. The diaphragm 102 adjusts a light amount at the time of shooting by adjusting its aperture diameter, and also functions as a shutter for adjusting exposure time in seconds at the time of still image shooting. The diaphragm 102 and the second lens assembly 103 can integrally move in the optical axis direction OA, and realize a zoom function in coordination with the advancing/receding operation of the first lens assembly 101. The focus lens 104 can move in the optical axis direction OA, and depending on its position, a distance of a subject on which the lens unit 100 focuses (focus distance) changes. Controlling the position of the focus lens 104 in the optical axis direction OA enables focus adjustment whereby the focus distance of the lens unit 100 is adjusted (focus control).

The driving/control system includes a zoom actuator 111, a diaphragm actuator 112, a focus actuator 113, a zoom driving circuit 114, a diaphragm driving circuit 115, a focus driving circuit 116, a lens MPU 117, and a lens memory 118. Using the zoom actuator 111, the zoom driving circuit 114 drives the first lens assembly 101 and the second lens assembly 103 in the optical axis direction OA, and controls an angle of view of the optical system of the lens unit 100 (performs a zoom operation). Using the diaphragm actuator 112, the diaphragm driving circuit 115 drives the diaphragm 102, and controls the aperture diameter and the opening/closing operation of the diaphragm 102. Using the focus actuator 113, the focus driving circuit 116 drives the focus lens 104 in the optical axis direction OA, and controls the focus distance of the optical system of the lens unit 100 (performs focus control). Also, the focus driving circuit 116 has a function of a position detection unit that detects a current position (lens position) of the focus lens 104 with use of the focus actuator 113.

The lens MPU 117 (processor) performs all of the computation and control pertaining to the lens unit 100, and controls the zoom driving circuit 114, the diaphragm driving circuit 115, and the focus driving circuit 116. Also, the lens MPU 117 is connected to a camera MPU 125 via the mount M, and communicates commands and data. For example, the lens MPU 117 detects a position of the focus lens 104, and gives notice of lens position information in response to a request from the camera MPU 125. This lens position information includes information of, for example, a position of the focus lens 104 in the optical axis direction OA, a position in the optical axis direction OA and a diameter of an exit pupil in a state where the optical system has not moved, and a position in the optical axis direction OA and a diameter of a lens frame that restricts light beams in the exit pupil. Furthermore, the lens MPU 117 controls the zoom driving circuit 114, the diaphragm driving circuit 115, and the focus driving circuit 116 in response to a request from the camera MPU 125. The lens memory 118 stores optical information for automatic focus adjustment (AF control). The camera MPU 125 controls the operations of the lens unit 100 by, for example, executing a program stored in a built-in nonvolatile memory or the lens memory 118.

The camera main body 120 includes an optical low-pass filter 121, an image sensor 122, and a driving/control system. The optical low-pass filter 121 and the image sensor 122 function as an image capturing unit (image capturing unit) that photoelectrically converts a subject image (optical image) formed via the lens unit 100 and outputs image data. In the present embodiment, the image sensor 122 photoelectrically converts a subject image formed via a shooting optical system, and outputs a captured image signal and focus detection signals individually as image data. Furthermore, in the present embodiment, the first lens assembly 101, the diaphragm 102, the second lens assembly 103, the focus lens 104, and the optical low-pass filter 121 compose the image capturing optical system.

The optical low-pass filter 121 reduces false color and moiré of a shot image. In the image sensor 122, which is composed of a CMOS image sensor and peripheral circuits thereof, m pixels and n pixels are arranged in a horizontal direction and a vertical direction, respectively (where m, n are integers equal to or larger than two). The image sensor 122 of the present embodiment also plays the role of a focus detection element, has a pupil division function, and includes pupil division pixels capable of focus detection of a phase-difference detection method (phase detection AF) with use of image data (image signals). Based on image data output from the image sensor 122, an image processing circuit 124 generates data for phase detection AF and image data for display, recording, and subject detection.

The driving/control system includes an image sensor driving circuit 123, the image processing circuit 124, the camera MPU 125, a display device 126, an operation switch assembly (operation SW) 127, a memory 128, a phase detection AF unit 129 (image capturing surface phase difference focus detection unit, control unit), an AE unit 130 (control unit), a white balance adjustment unit 131 (control unit), and a subject detection unit 132 (detection unit). The image sensor driving circuit 123 controls the operations of the image sensor 122, applies A/D conversion to image signals (image data) output from the image sensor 122, and transmits the resultant image signals to the camera MPU 125. The image processing circuit 124 performs general image processing that is performed in a digital camera, such as y conversion, color interpolation processing, and compression encoding processing, with respect to image signals output from the image sensor 122. Also, the image processing circuit 124 generates a signal for phase detection AF, a signal for AE, a signal for white balance adjustment, and a signal for subject detection. In the present embodiment, the signal for phase detection AF, the signal for AE, the signal for white balance adjustment, and the signal for subject detection are generated individually; however, for example, the signal for AE, the signal for white balance adjustment, and the signal for subject detection may be generated as the same signal. Furthermore, the combination of signals that are used as the same signal is not limited to the foregoing.

The camera MPU 125 (processor, control apparatus) performs all of the computation and control pertaining to the camera main body 120. That is to say, the camera MPU 125 controls the image sensor driving circuit 123, the image processing circuit 124, the display device 126, the operation switch assembly 127, the memory 128, the phase detection AF unit 129, the AE unit 130, the white balance adjustment unit 131, and the subject detection unit 132. The camera MPU 125 is connected to the lens MPU 117 via a signal wire of the mount M, and communicates commands and data with the lens MPU 117. The camera MPU 125 issues requests for obtainment of a lens position and for lens driving of a predetermined driving amount to the lens MPU 117, and issues, from the lens MPU 117, a request for obtainment of optical information that is unique to the lens unit 100 and the like.

A ROM 125a that stores a program for controlling the operations of the camera main body 120, a RAM 125b (camera memory) that stores variables, and an EEPROM 125c that stores various types of parameters are built in the camera MPU 125. Also, the camera MPU 125 executes focus detection processing based on the program stored in the ROM 125a. In the focus detection processing, known correlation computation processing is executed using a pair of image signals obtained by photoelectrically converting optical images formed by light beams that have passed through different pupil areas (pupil partial areas) in the image capturing optical system.

The display device 126 is composed of, for example, an LCD, and displays information related to a shooting mode of the image capturing apparatus 10, a preview image before shooting, an image for confirmation after shooting, an in-focus state display image at the time of focus detection, and so forth. The operation switch assembly 127 is composed of a power source switch, a release (shooting trigger) switch, a zoom operation switch, a shooting mode selection switch, and so forth. The memory 128 (recording unit) is a removable flash memory, and images that have already been shot are recorded therein.

The phase detection AF unit 129 performs focus detection processing of a phase-difference detection method based on an image signal of image data for focus detection obtained from the image sensor 122 and the image processing circuit 124 (a signal for phase detection AF). More specifically, the image processing circuit 124 generates a pair of image data pieces, which is formed by light beams that pass through a pair of pupil areas in the image capturing optical system, as data for focus detection, and the phase detection AF unit 129 detects a focus displacement amount based on an amount of displacement between the pair of image data pieces. In this way, the phase detection AF unit 129 of the present embodiment performs phase detection AF based on an output from the image sensor 122 (image capturing surface phase detection AF) without using a dedicated AF sensor. In the present embodiment, the phase detection AF unit 129 includes an obtainment unit 129a and a calculation unit 129b. The operations each of these units will be described later.

Note that at least a part of the phase detection AF unit 129 (a part of the obtainment unit 129a or the calculation unit 129b) may be provided in the camera MPU 125. The details of the operations of the phase detection AF unit 129 will be described later. The phase detection AF unit 129 functions as a focus control unit that controls a position of the focus lens 104 with use of the result of focus detection.

The AE unit 130 performs exposure adjustment processing for making shooting conditions appropriate by performing photometry based on a signal for AE obtained from the image sensor 122 and the image processing circuit 124. Specifically, photometry is performed based on a signal for AE, and an exposure amount corresponding to the f-number, the shutter speed, and the ISO film speed that are currently set is calculated. Exposure adjustment processing is performed by computing an appropriate f-number, shutter speed, and ISO film speed to be set at the time of shooting from the difference between the calculated exposure amount and a proper exposure amount that has been set in advance, and by setting the results of the computation as shooting conditions. The AE unit 130 functions as an exposure adjustment unit that calculates exposure conditions at the time of shooting with use of the results of photometry, and controls the f-number, the shutter speed, and the ISO film speed of the diaphragm 102.

The white balance adjustment unit 131 performs white balance adjustment processing based on a signal for white balance adjustment obtained from the image sensor 122 and the image processing circuit 124. Specifically, white balance adjustment processing is performed by calculating white balance of a signal for white balance adjustment, and by adjusting the weights of colors based on the difference from appropriate white balance that has been set in advance.

The subject detection unit 132 performs subject detection processing based on a signal for subject detection generated by the image processing circuit 124. The type and state (detection attribute) of a subject, as well as the position and size (detection area) of the subject, are detected through subject detection processing. Note that the details of the operations of the subject detection unit 132 will be described later.

As described above, the image capturing apparatus 10 of the present embodiment can execute phase detection AF, photometry (exposure adjustment), white balance adjustment, and subject detection in combination, and the position (image height range) in which phase detection AF, photometry, and white balance adjustment are performed can be selected in accordance with the result of subject detection.

Configuration of Image Sensor 122

Figure 2:
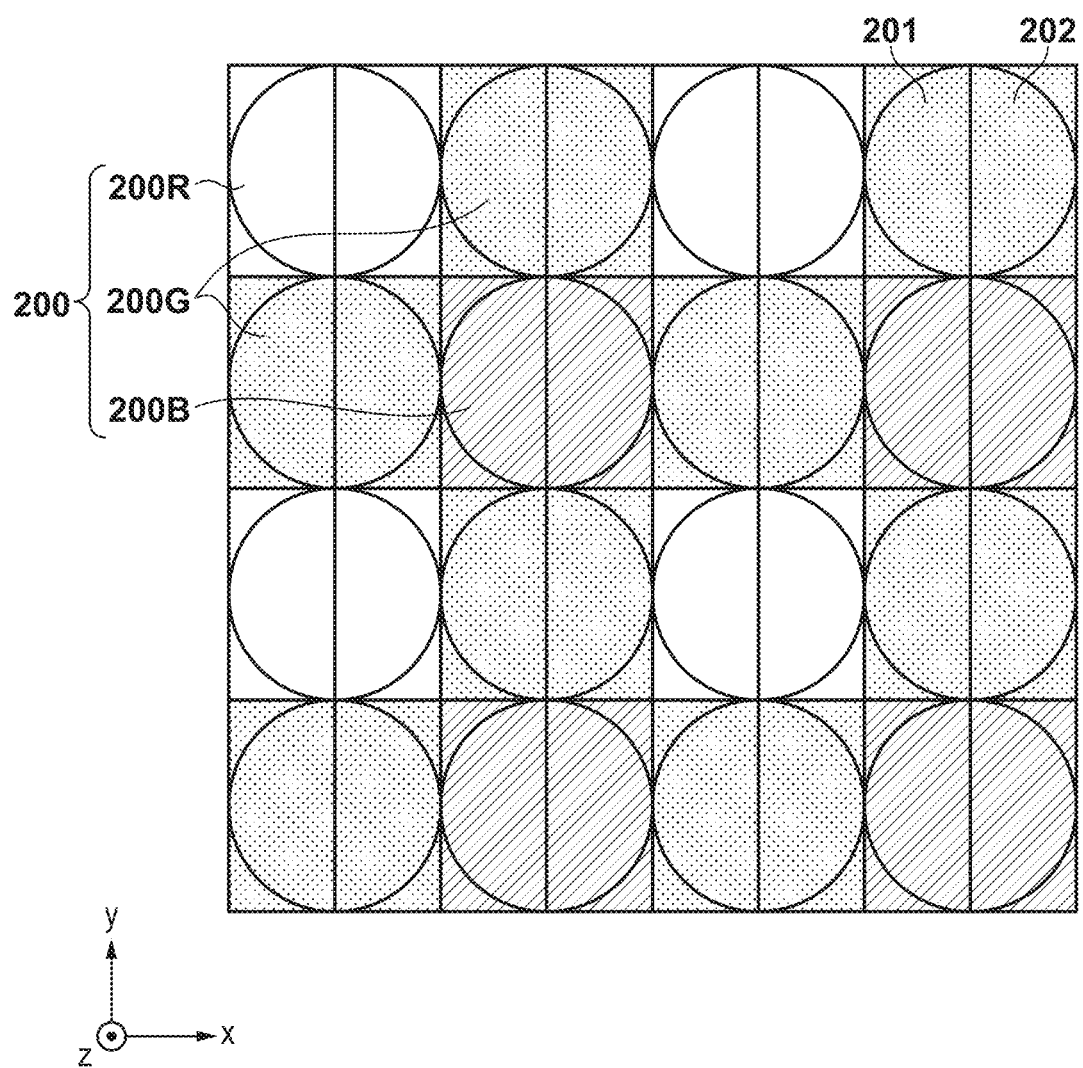
FIG. 2 is a schematic diagram of the arrangement of image capturing pixels (and focus detection pixels) of an image sensor 122.

FIG. 2 is a schematic diagram of the arrangement of image capturing pixels (and focus detection pixels) of the image sensor 122. FIG. 2 shows the arrangement of pixels (image capturing pixels) of the two-dimensional CMOS sensor (image sensor 122) of the present embodiment in a range of four columns×four rows, and the arrangement of focus detection pixels in a range of eight columns×four rows. In the first embodiment, in a pixel group 200 having two columns×two rows shown in FIG. 2, a pixel 200R having a spectral sensitivity for R (red) is arranged in the upper left, pixels 200G having a spectral sensitivity for G (green) are arranged in the upper right and the lower left, and a pixel 200B having a spectral sensitivity for B (blue) is arranged in the lower right. Furthermore, each pixel is composed of a first focus detection pixel 201 and a second focus detection pixel 202 that are arranged in two columns× one row.

A captured image (focus detection signals) can be obtained as a large number of four column×four row pixels (eight column×four row focus detection pixels) shown in FIG. 2 are arranged on a surface. In the present embodiment, it is assumed that a period P of pixels is 4 µm, the number of pixels N is 5575 columns horizontally×3725 rows vertically=approximately 20750000 pixels, a column-direction period PAF of focus detection pixels is 2 µm, and the number of focus detection pixels NAF is 11150 columns horizontally×3725 rows vertically=approximately 41500000 pixels.

Figure 3A:
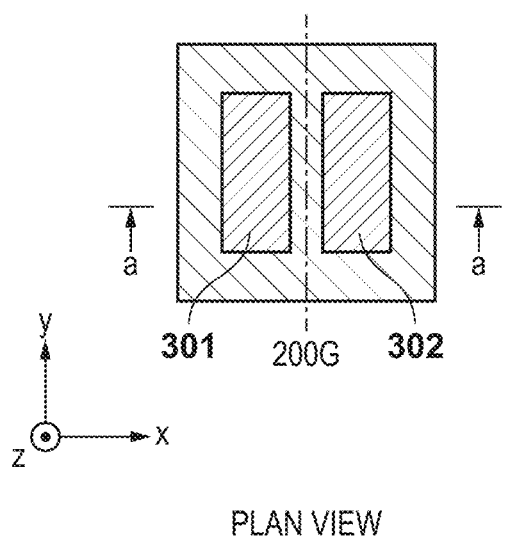
FIG. 3A is a plan view of one pixel 200G of the image sensor 122 shown in FIG. 2 as viewed from the light-receiving surface side (+z side) of the image sensor 122.
Figure 3B:
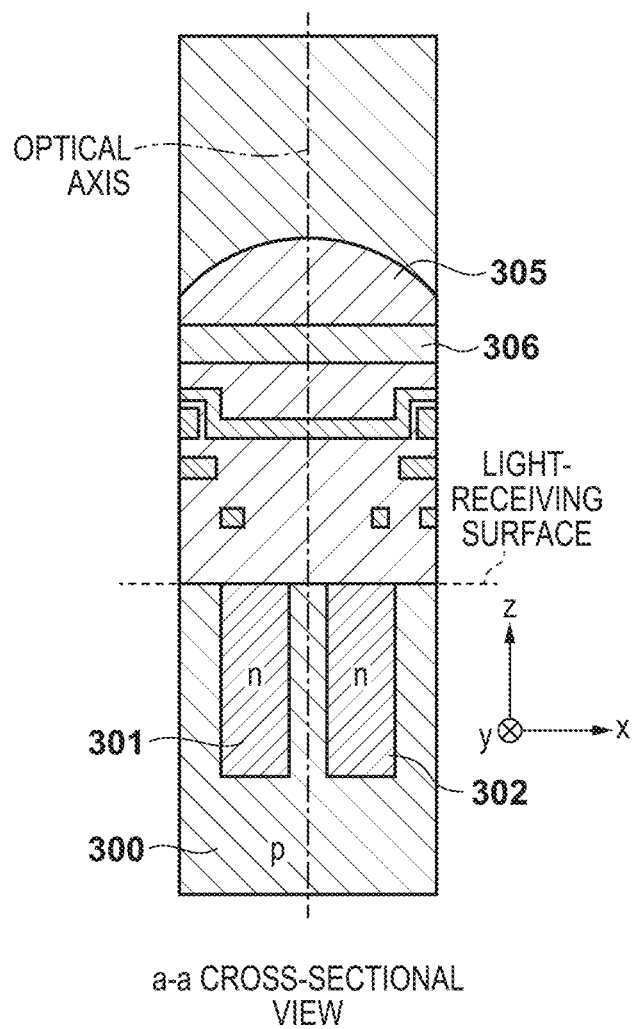
FIG. 3B is a cross-sectional view of an a-a cross section of FIG. 3A as viewed from the −y side.

FIG. 3A is a plan view of one pixel 200G of the image sensor 122 shown in FIG. 2 as viewed from the light-receiving surface side (+z side) of the image sensor 122, whereas FIG. 3B is a cross-sectional view of an a-a cross section of FIG. 3A as viewed from the −y side.

As shown in FIGS. 3A and 3B, in the pixel 200G of the present embodiment, a microlens 305 for collecting incident light is formed on the light-receiving side of each pixel, and a photoelectric conversion unit 301 and a photoelectric conversion unit 302 are formed as a result of division into NH (two) in the x direction and division into NV (one) in the y direction. The photoelectric conversion unit 301 and the photoelectric conversion unit 302 respectively correspond to the first focus detection pixel 201 and the second focus detection pixel 202.

The photoelectric conversion unit 301 and the photoelectric conversion unit 302 may be pin-structure photodiodes in which an intrinsic layer is sandwiched between a p-type layer and an n-type layer, or may be a p-n junction photodiode in which an intrinsic layer is omitted where appropriate. In each pixel, a color filter 306 is formed between the microlens 305 and the photoelectric conversion units 301, 302. Also, where necessary, the spectral transmittance of the color filter 306 may vary with each sub-pixel, or the color filter 306 may be omitted.

Light incident on the pixel 200G shown in FIGS. 3A and 3B is collected by the microlens 305, dispersed by the color filter 306, and then received by the photoelectric conversion unit 301 and the photoelectric conversion unit 302. In the photoelectric conversion unit 301 and the photoelectric conversion unit 302, electron-hole pairs are generated in accordance with the amount of received light, and separated in a depletion layer; then, negatively-charged electrons are accumulated in the n-type layer (not shown). On the other hand, holes are discharged to the outside of the image sensor 122 via the p-type layer connected to a constant-voltage source (not shown). The electrons accumulated in the n-type layers (not shown) of the photoelectric conversion unit 301 and the photoelectric conversion unit 302 are transferred to a capacitance unit (FD) via a transfer gate, and converted into a voltage signal.

Figure 4:
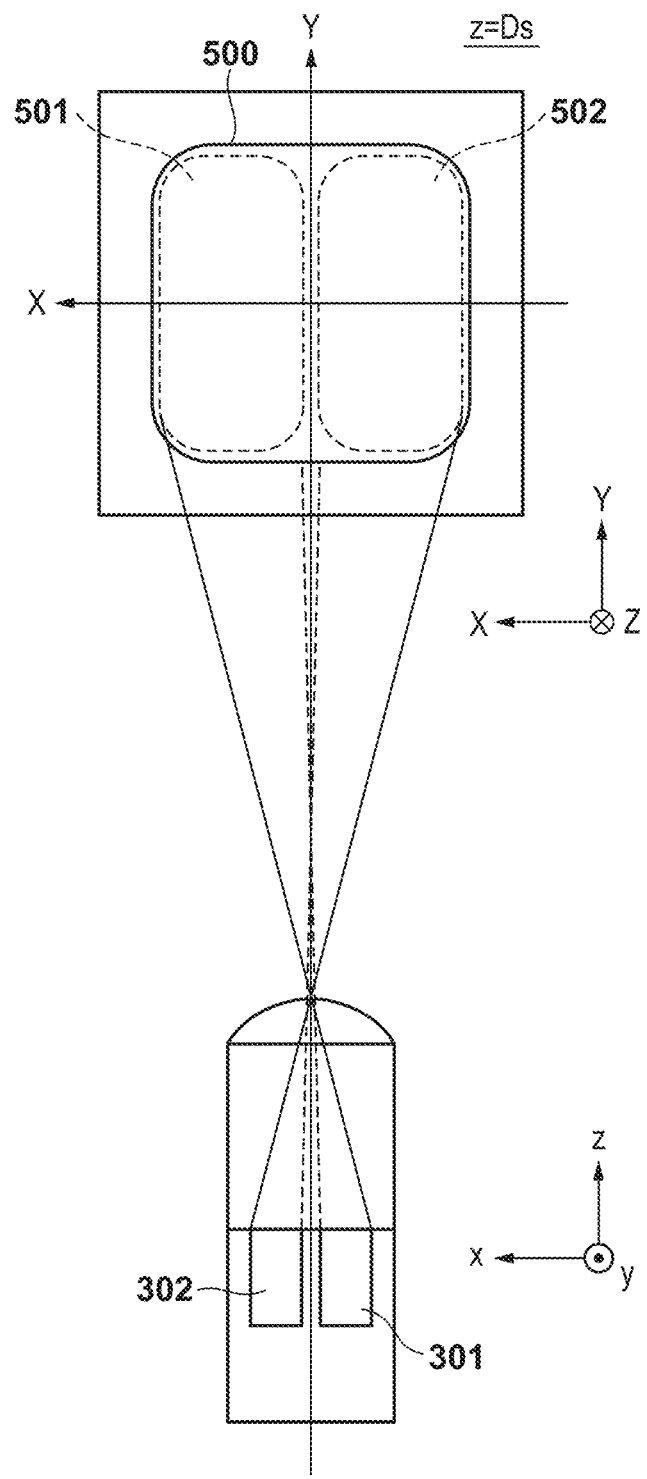
FIG. 4 is a schematic explanatory diagram showing a correspondence relationship between a pixel structure of the present embodiment shown in FIGS. 3A and 3B and pupil division.

FIG. 4 is a schematic explanatory diagram showing a correspondence relationship between the pixel structure of the present embodiment shown in FIGS. 3A and 3B and pupil division. FIG. 4 shows a cross-sectional view of the a-a cross section of the pixel structure of the present embodiment shown in FIG. 3A as viewed from the +y side, and a pupil surface of the image sensor 122 (pupil distance Ds). In FIG. 4, for the sake of correspondence with the coordinate axes of the pupil surface of the image sensor 122, the x-axis and the y-axis of the cross-sectional view are inverted relative to FIGS. 3A and 3B.

In FIG. 4, a first pupil partial area 501 for the first focus detection pixel 201 is substantially in a conjugate relationship with a light-receiving surface of the photoelectric conversion unit 301, whose center of mass is decentered in the −x direction, due to the microlens, and represents a pupil area via which light can be received by the first focus detection pixel 201. The center of mass of the first pupil partial area 501 for the first focus detection pixel 201 is decentered toward the +X side on the pupil surface. In FIG. 4, a second pupil partial area 502 for the second focus detection pixel 202 is substantially in a conjugate relationship with a light-receiving surface of the photoelectric conversion unit 302, whose center of mass is decentered in the +x direction, due to the microlens, and represents a pupil area via which light can be received by the second focus detection pixel 202. The center of mass of the second pupil partial area 502 for the second focus detection pixel 202 is decentered toward the −X side on the pupil surface. Furthermore, in FIG. 4, a pupil area 500 is a pupil area via which light can be received by the entire pixel 200G, with all of the photoelectric conversion unit 301 and the photoelectric conversion unit 302 (the first focus detection pixel 201 and the second focus detection pixel 202) combined.

Image capturing surface phase detection AF is affected by diffraction because pupil division is performed using the microlenses of the image sensor. In FIG. 4, as opposed to a pupil distance of several tens of mm to the pupil surface of the image sensor, the diameter of the microlenses is several µm. As a result, the f-number of the microlenses becomes several tens of thousands, and a diffraction blur occurs at the level of several tens of mm Therefore, images on the light-receiving surfaces of the photoelectric conversion units represent the properties of light-receiving sensitivity (the incidence angle distribution of light receiving rates), rather than clear pupil areas or pupil partial areas.

Figure 5:
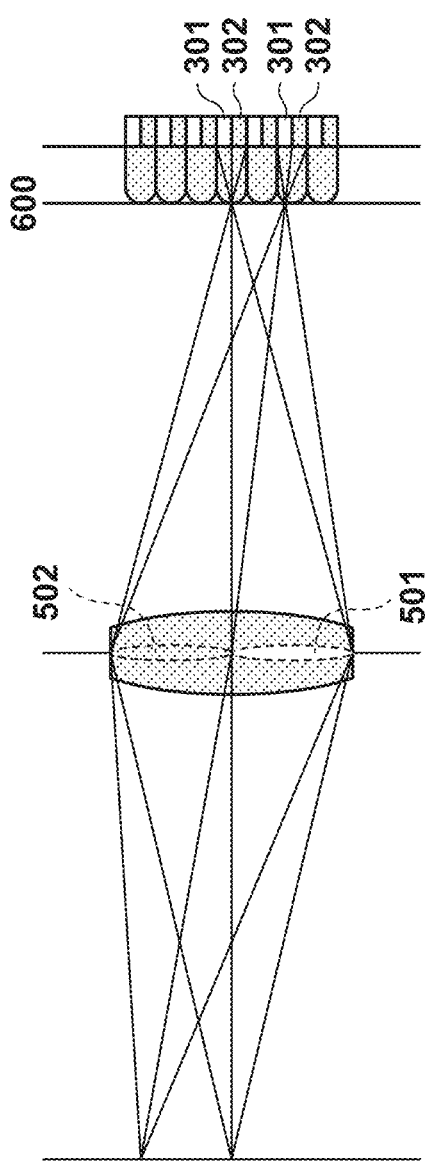
FIG. 5 is a schematic diagram showing a correspondence relationship between the image sensor 122 and pupil division.

FIG. 5 is a schematic diagram showing a correspondence relationship between the image sensor 122 and pupil division. The image sensor 122 is arranged on an image capturing surface 600. Light beams that have passed through different pupil partial areas in the first pupil partial area 501 and the second pupil partial area 502 are incident on respective pixels of the image sensor 122 at different angles, and received by the first focus detection pixel 201 and the second focus detection pixel 202, which are formed by 2×1 division. The present embodiment is an example in which a pupil area has been divided into two in the horizontal direction. Pupil division may be performed in the vertical direction where necessary.

A plurality of image capturing pixels that include the first focus detection pixel 201 and the second focus detection pixel 202 are arranged in the image sensor 122 of the present embodiment. The first focus detection pixel 201 receives light beams that pass through the first pupil partial area 501 of the shooting optical system. On the other hand, the second focus detection pixel 202 receives light beams that pass through the second pupil partial area 502 of the shooting optical system, which is different from the first pupil partial area 501. Furthermore, the image capturing pixel receives light beams that pass through a pupil area representing the combination of the first pupil partial area 501 and the second pupil partial area 502 of the shooting optical system.

In the image sensor 122 of the present embodiment, each image capturing pixel is composed of the first focus detection pixel 201 and the second focus detection pixel 202. Where necessary, it is permissible to adopt a configuration in which the image capturing pixels, the first focus detection pixels 201, and the second focus detection pixels 202 are discrete pixel components, and the first focus detection pixels 201 and the second focus detection pixels 202 are partially arranged in parts of the arrangement of the image capturing pixels.

In the present embodiment, focus detection is performed by collecting received light signals of the first focus detection pixels 201 in respective pixels of the image sensor 122 to generate a first focus signal, and collecting received light signals of the second focus detection pixels 202 in respective pixels to generate a second focus signal. Furthermore, signals of the first focus detection pixel 201 and the second focus detection pixel 202 are added on a per-pixel basis in the image sensor 122, thereby generating a captured image signal (captured image) with a resolution corresponding to N effective pixels. A method of generating each signal is not limited to the foregoing method; for example, the second focus detection signal may be generated from the difference between the captured image signal and the first focus signal.

Relationship Between Defocus Amount and Image Displacement Amount

The following describes a relationship between a defocus amount and an image displacement amount based on the first focus detection signal and the second focus detection signal obtained by the image sensor 122 of the present embodiment.

Figure 6:
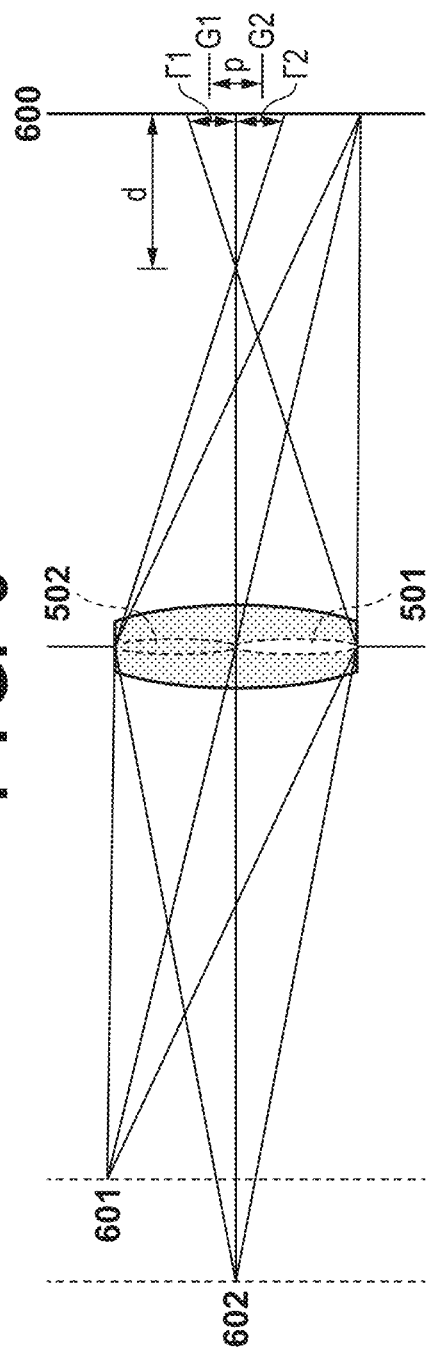
FIG. 6 is a schematic diagram of a relationship between a defocus amount based on a first focus detection signal and a second focus detection signal and an amount of image displacement between the first focus detection signal and the second focus detection signal.

FIG. 6 is a schematic diagram of a relationship between a defocus amount based on the first focus detection signal and the second focus detection signal and an amount of image displacement between the first focus detection signal and the second focus detection signal. The image sensor 122 is arranged on the image capturing surface 600. Similarly to FIG. 4 and FIG. 5, the pupil surface of the image sensor 122 is divided into two, namely into the first pupil partial area 501 and the second pupil partial area 502.

Regarding a defocus amount d, provided that the distance from the position of subject image formation to the image capturing surface is a magnitude |d|, a front focus state where the position of subject image formation is on the side closer to a subject relative to the image capturing surface is defined using a negative sign (d<0). On the other hand, a rear focus state where the position of subject image formation is on the side opposite to a subject relative to the image capturing surface is defined using a positive sign (d>0). In an in-focus state where the position of subject image formation is on the image capturing surface (in-focus position), d=0. FIG. 6 shows an example in which a subject 601 is in the in-focus state (d=0) whereas a subject 602 is in the front focus state (d<0). The front focus state (d<0) and the rear focus state (d>0) are collectively considered as a defocus state (|d|>0).

In the front focus state (d<0), among light beams from the subject 602, light beams that have passed through the first pupil partial area 501 (second pupil partial area 502) are concentrated once, and then disperse over a width of $\Gamma 1$ ($\Gamma 2$) around the center-of-mass position G1 (G2) of light beams, thereby forming a blurry image on the image capturing surface 600. Light of the blurry image is received by the first focus detection pixel 201 (second focus detection pixel 202) that composes each pixel arranged in the image sensor 122, and the first focus detection signal (second focus detection signal) is generated. Therefore, the first focus detection signal (second focus detection signal) is recorded as a subject image of the subject 602 that has been blurred over a width of $\Gamma 1$ ($\Gamma 2$) at the center-of-mass position G1 (G2) on the image capturing surface 600. The blur width $\Gamma 1$ ($\Gamma 2$) of the subject image increases roughly in proportion to an increase in the magnitude |d| of the defocus amount d. Similarly, a magnitude |p| of an amount of image displacement p between the subject images of the first focus detection signal and the second focus detection signal (=the difference G1−G2 between the center-of-mass positions of light beams) also increases roughly in proportion to an increase in the magnitude |d| of the defocus amount d. The same goes for the rear focus state (d>0), although in this case the direction of image displacement between the subject images of the first focus detection signal and the second focus detection signal is opposite to the front focus state.

The magnitude of the amount of image displacement between the first focus detection signal and the second focus detection signal increases with an increase in the magnitude of the defocus amount of the first focus detection signal and the second focus detection signal, or the captured image signal obtained by adding the first focus detection signal and the second focus detection signal. Therefore, in the present embodiment, the phase detection AF unit 129 makes use of the relationship in which the magnitude of the amount of image displacement between the first focus detection signal and the second focus detection signal increases with an increase in the magnitude of the defocus amount of the captured image signal, and converts the amount of image displacement into a detected defocus amount with use of a conversion coefficient calculated based on a base-line length.

Flow of Shooting Processing

Figure 7:
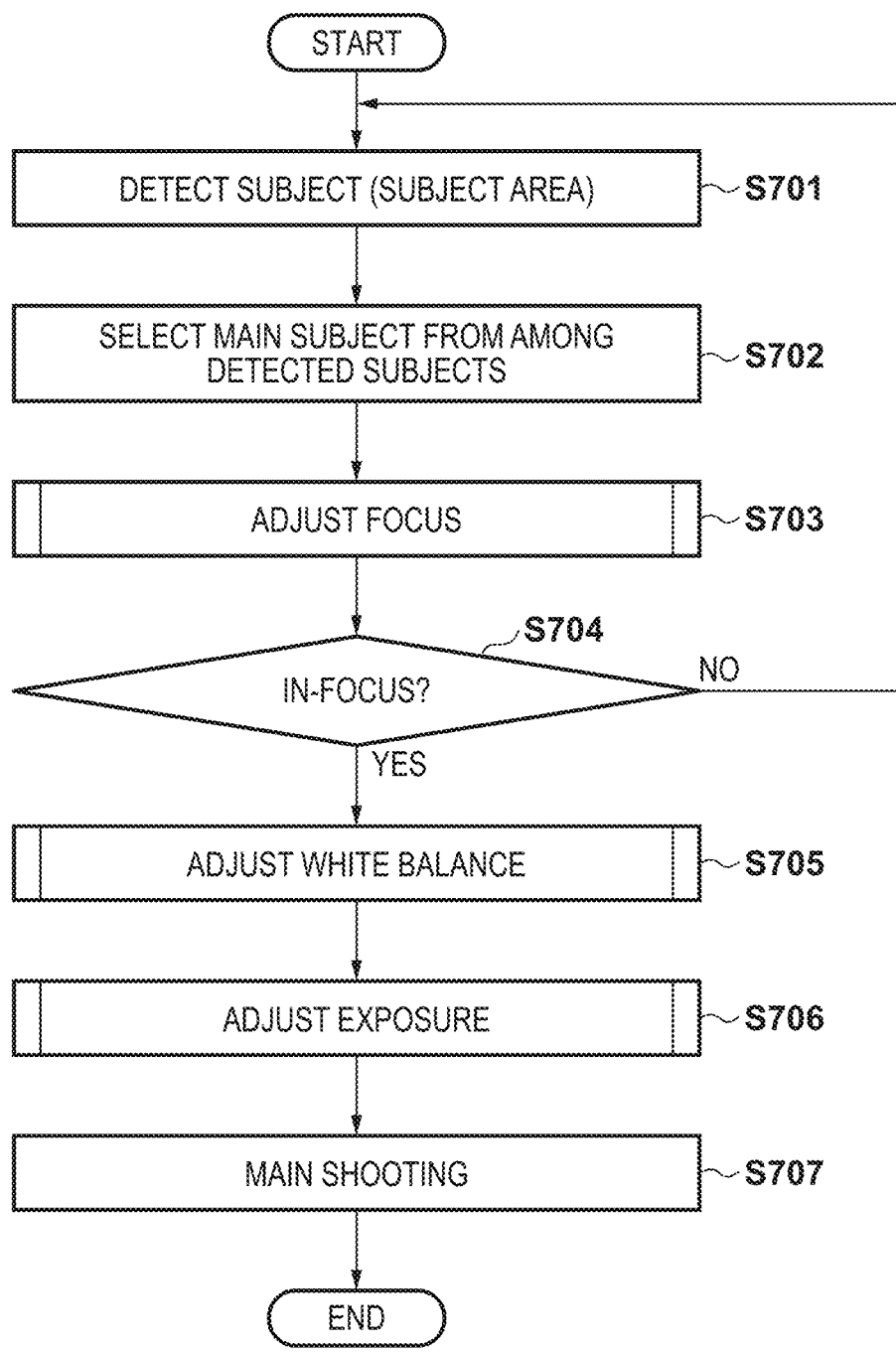
FIG. 7 is a flowchart of shooting processing.

FIG. 7 is a flowchart of shooting processing. This shooting processing is executed by the camera MPU 125. Also, the lens MPU 117 shares a part of the processing where necessary.

In step S701, the camera MPU 125 executes subject detection by controlling the subject detection unit 132 based on captured image data generated by the image sensor 122 (e.g., data obtained through live-view shooting). The following describes the positions and sizes (subject areas) of the subjects detected by the subject detection unit 132 according to the present embodiment.

Figure 8:
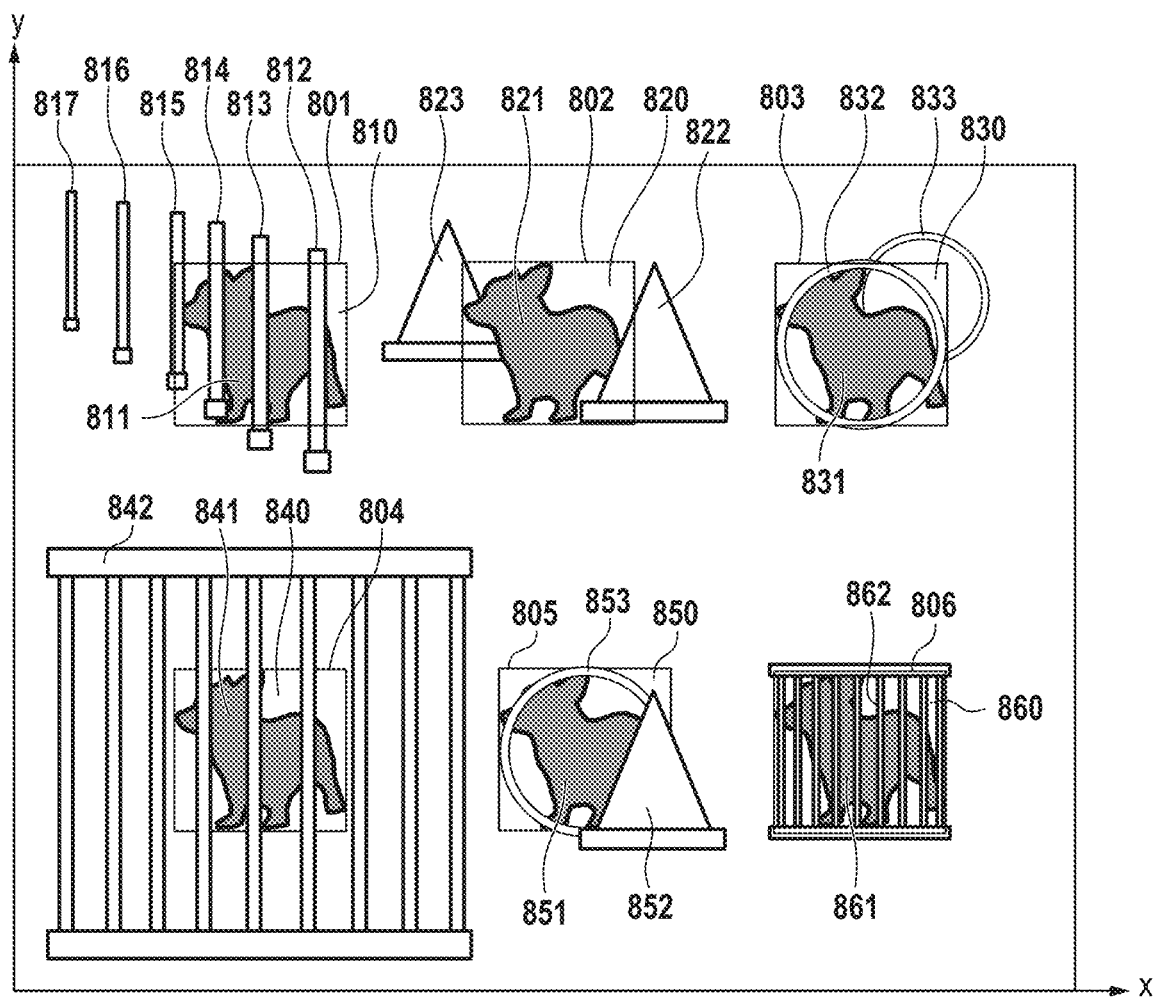
FIG. 8 is a schematic diagram of a relationship between subjects (detection targets) and detection areas (subject areas).

FIG. 8 is a schematic diagram of a relationship between subjects (detection targets) and detection areas (subject areas). In FIG. 8, subject areas 801 to 806 are subject areas that have been detected by the subject detection unit 132. As can be understood from FIG. 8, a subject area is an area that partially includes a subject (a dog, according to the example of FIG. 8) to be detected. In other words, a subject area also includes an area that does not include a subject to be detected (e.g., an area such as a pole and a background). That is to say, in the present embodiment, such phrases as "subject detection" and "detect a subject" do not strictly refer to detection of an area that includes a specific subject, but refer to detection of an area that partially includes a subject to be detected.

The positions and sizes of respective subject areas are represented as in Table 1. The subject detection unit 132 detects the subject areas in the shooting range based on a signal for subject detection generated by the image processing circuit 124. The subject area includes both of a subject to be detected and a subject that is not to be detected.

TABLE 1

| | SUBJECT AREA | |
|---|---|---|
| | POSITION | SIZE |
| 801 | (x1, y1) | (w1, h1) |
| 802 | (x2, y2) | (w2, h2) |
| 803 | (x3, y3) | (w3, h3) |
| 804 | (x4, y4) | (w4, h4) |
| 805 | (x5, y5) | (w5, h5) |
| 806 | (x6, y6) | (w6, h6) |

In FIG. 8, reference signs 810, 820, 830, 840, 850, and 860 indicate a background (a subject that is not to be detected). Reference signs 811, 821, 831, 841, 851, and 861 indicate a dog (a subject to be detected). Reference signs 812 to 817 indicate poles (subjects that are not to be detected), reference signs 822, 823, and 852 indicate triangle cones (subjects that are not to be detected), and reference signs 832, 833, and 853 indicate rings to be passed through by the dog (subjects that are not to be detected). Reference sign 842 indicates a cage (a subject that is not to be detected) larger than the dog (the subject to be detected), and reference sign 862 indicates a cage (a subject that is not to be detected) that is approximately the same in size as the dog (the subject to be detected).

In the examples of FIG. 8, a plurality of subject areas related to the subject to be detected are detected from one subject detection signal. However, the subject detection unit 132 may detect a subject area that has the highest possibility of being a main subject. Also, although it is assumed here that the dog is detected as the subject, another animal, such as a cat and a bird, or a vehicle, such as a car and an airplane, may be detected. Furthermore, although it is assumed here that the entire body of the dog is detected as the subject, a specific location, such as a face and a pupil, may be detected. In addition, a specific part, such as a driver of a vehicle and a head of the driver, may be detected.

Returning to FIG. 7, in step S702, the camera MPU 125 selects a main subject from among the subjects detected in step S701. The main subject is selected (determined) in accordance with preset priority ranks of subject areas (positions, sizes). For example, a higher priority rank is set for a subject area position at the center image height, and with regard to subject areas at the same position (having the same distance from the central image height), a higher priority rank is set for a larger subject area.

In step S703, the camera MPU 125 executes focus adjustment (focus control) by controlling the phase detection AF unit 129. The details of focus adjustment will be described later.

In step S704, the camera MPU 125 makes a determination about focus. When it is determined that focus has been achieved, processing proceeds to step S705; when it is determined that focus has not been achieved, processing returns to step S701.

In step S705, the camera MPU 125 executes white balance adjustment (white balance control) by controlling the white balance adjustment unit 131. The details of white balance adjustment will be described later.

In step S706, the camera MPU 125 executes exposure adjustment (exposure control) by controlling the AE unit 130. The details of exposure adjustment will be described later.

In step S707, the camera MPU 125 executes main shooting (shooting of an image for recording).

Details of Focus Adjustment Processing in Step S703

Figure 9:
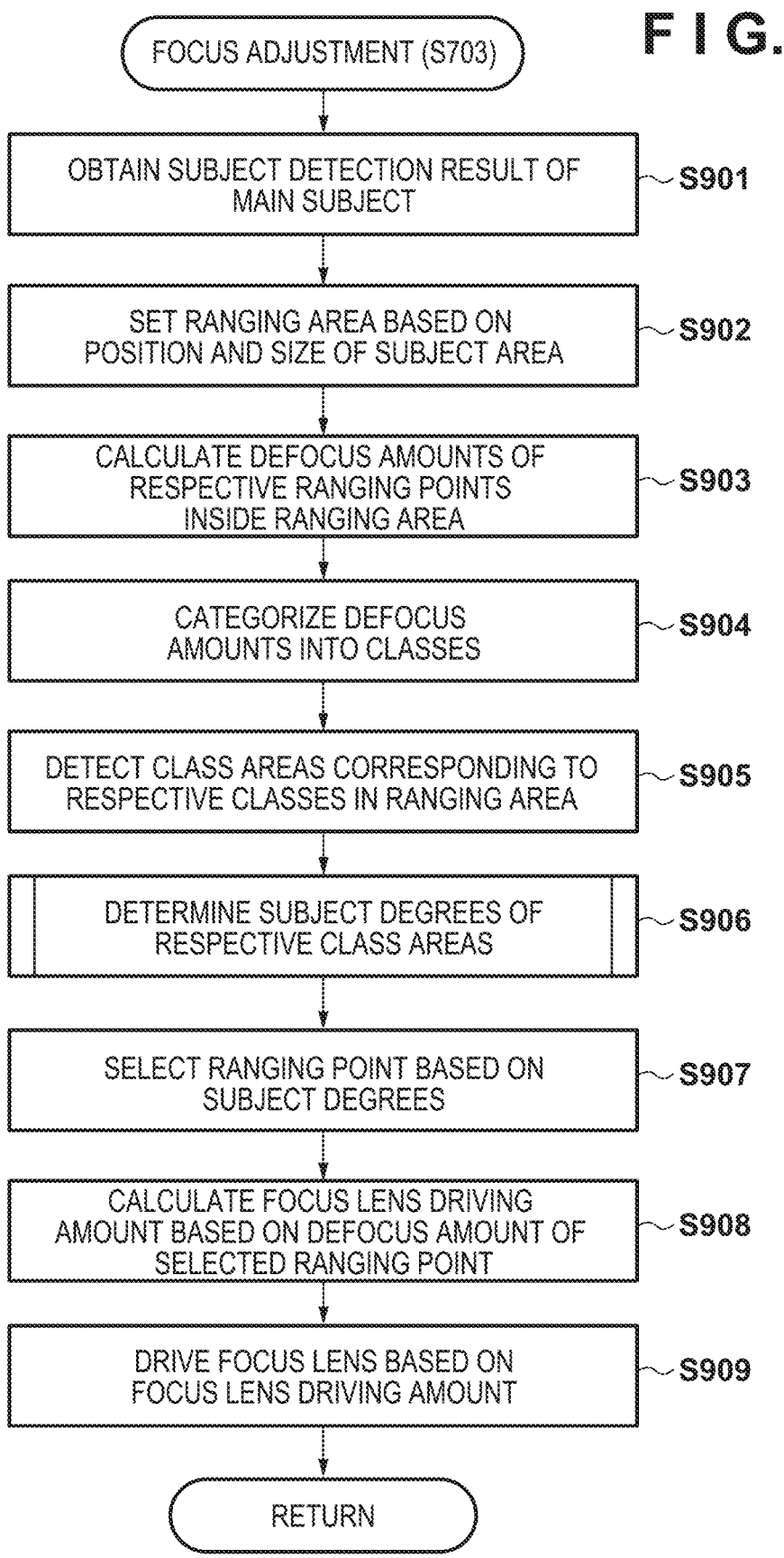
FIG. 9 is a flowchart showing the details of focus adjustment processing in step S703 of FIG. 7.
Figure 10A:
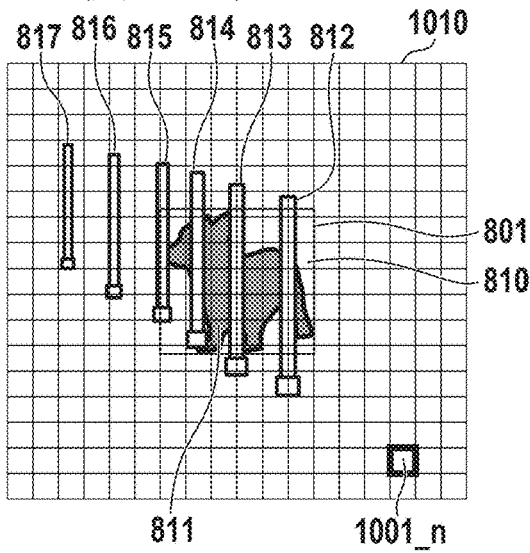
FIGS. 10A to 10F are schematic explanatory diagrams of ranging areas that have been set in relation to subject areas 801 to 806, respectively, based on the positions and the sizes of the subject areas.
Figure 10D:
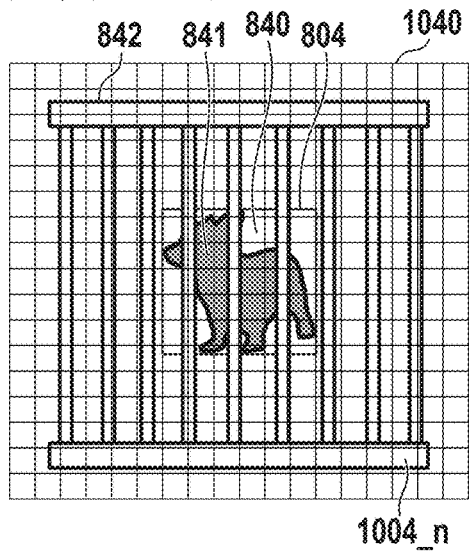
Figure 10B:
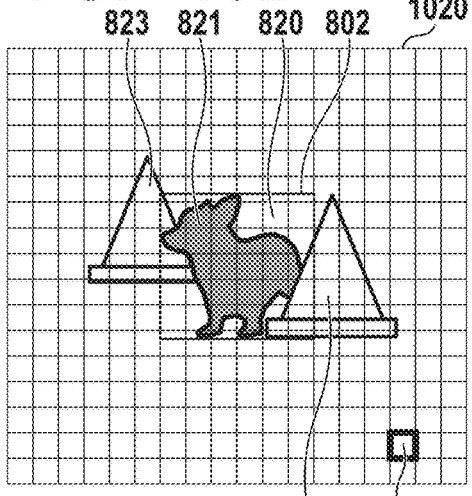
Figure 10E:
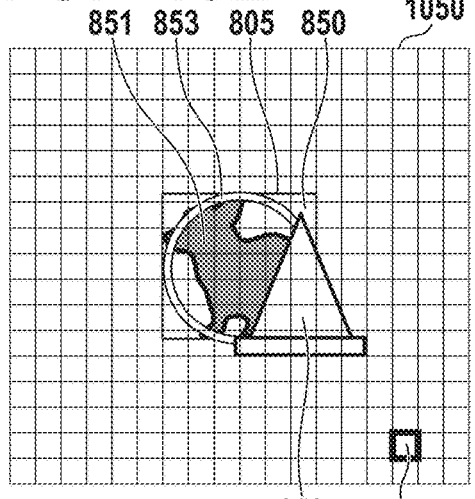
Figure 10C:
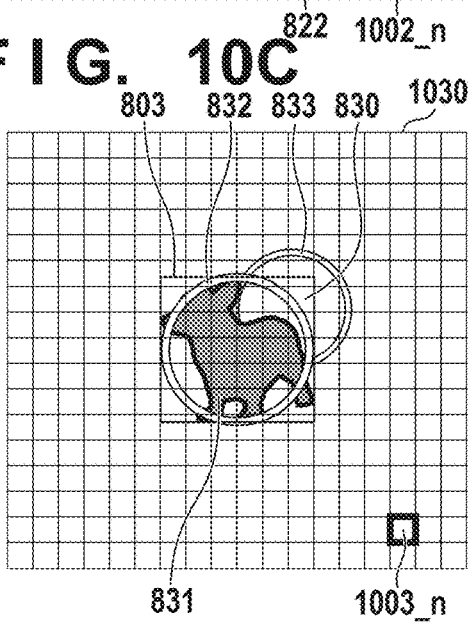
Figure 10F:
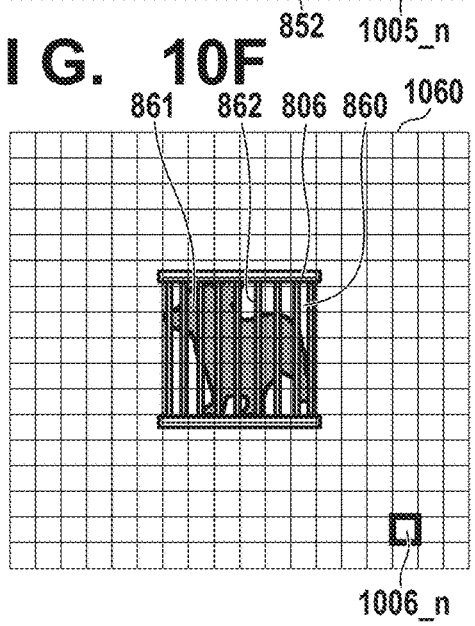
Figure 11A:
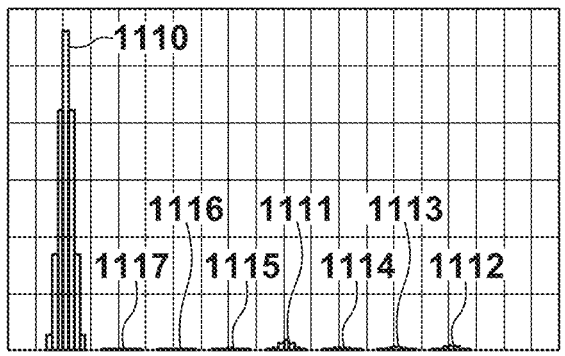
FIGS. 11A to 11F are schematic explanatory diagrams showing a state where the defocus amounts inside the ranging areas of FIGS. 10A to 10F have been categorized into classes.
Figure 11D:
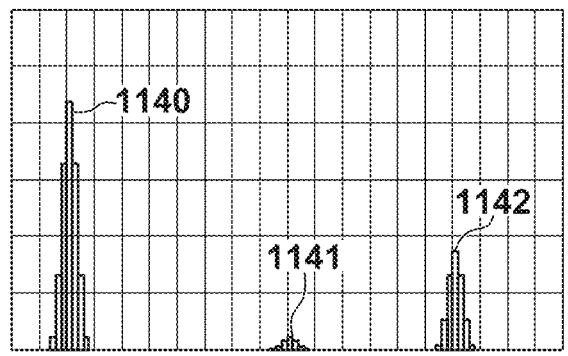
Figure 11B:
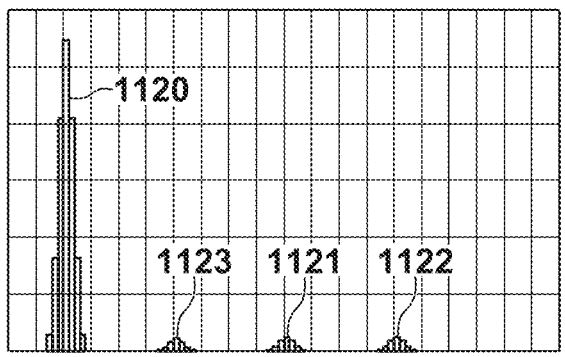
Figure 11E:
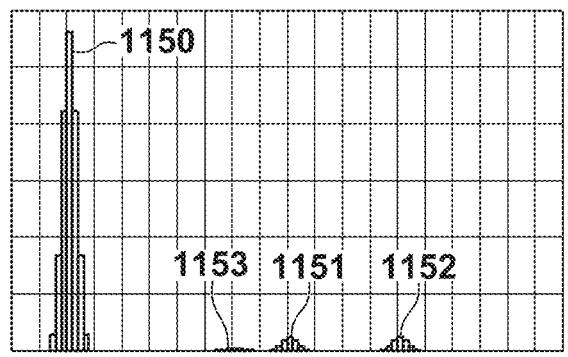
Figure 11C:
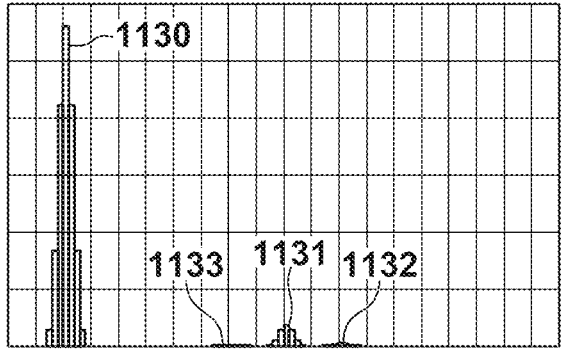
Figure 11F:
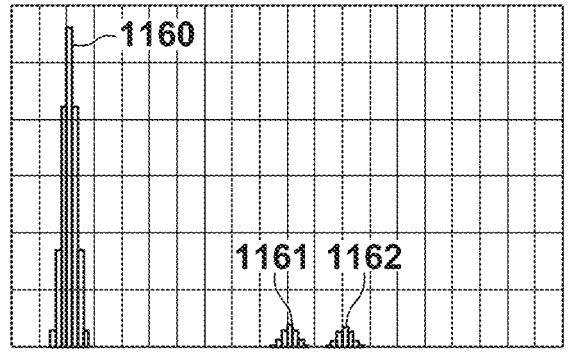

FIG. 9 is a flowchart showing the details of focus adjustment processing in step S703 of FIG. 7. Note that the processing of FIG. 9 is executed by the camera MPU 125 and the phase detection AF unit 129.

In step S901, the phase detection AF unit 129 obtains the subject detection results (subject area) of the main subject detected in steps S701 and S702.

In step S902, the phase detection AF unit 129 sets a ranging area (defocus amount calculation area) based on the position and size of the subject area obtained in step S901.

FIGS. 10A to 10F are schematic explanatory diagrams of ranging areas that have been set in relation to the subject areas 801 to 806, respectively, based on the positions and the sizes of the subject areas. FIGS. 10A, 10B, 10C, 10D, 10E, and 10F correspond to the subject area 801, the subject area 802, the subject area 803, the subject area 804, the subject area 805, and the subject area 806, respectively. Reference signs 1010, 1020, 1030, 1040, 1050, and 1060 indicate a ranging area.

In the examples of FIGS. 10A to 10F, with respect to each of the subject areas 801 to 806, the phase detection AF unit 129 sets the center of the ranging area based on the position of the subject area, and sets the range of the ranging area so that its size is three times larger than the size of the subject area in both of the vertical and horizontal directions. Although the range of the ranging area is set so that its size is three times larger than the subject area in the present embodiment, no limitation is intended by this, and the range of the ranging area may be set using another scale factor in accordance with the size of the subject area. Although the ranging area is larger than the subject area and includes the entirety of the subject area in the examples of FIGS. 10A to 10F, the ranging area may include a part of the subject area, or the ranging area may be smaller than the subject area. Reference signs 1001_*n* to 1006_*n* indicate one of ranging points in each ranging area.

By setting the ranging area based on the position of the subject area in the foregoing manner, the results of ranging near the main subject can be obtained at high densities, even in a case where the number of ranging points that can be simultaneously calculated is limited. Then, by selecting the optimal result of ranging from among the obtained results of ranging, the main subject can be brought into focus appropriately. Furthermore, setting the range of the ranging area using a scale factor corresponding to the size of the subject area makes it possible to use the results in the range of the ranging area that is always based on the same scale factor relative to the subject area in determining subject degrees, thereby improving the accuracy of the determination of the subject degrees.

Returning to FIG. 9, in step S903, the phase detection AF unit 129 calculates defocus amounts at respective ranging points inside the ranging area set in step S902.

In step S904, the camera MPU 125 categorizes the defocus amounts calculated in step S903 into classes.

FIGS. 11A to 11F are schematic explanatory diagrams showing a state where the defocus amounts inside the ranging areas of FIGS. 10A to 10F have been categorized into classes. In FIGS. 11A to 11F, a horizontal axis represents the defocus amounts, whereas a vertical axis represents the frequencies of the defocus amounts. FIGS. 11A, 11B, 11C, 11D, 11E, and 11F correspond to the ranging area 1010, the ranging area 1020, the ranging area 1030, the ranging area 1040, the ranging area 1050, and the ranging area 1060, respectively.

Reference signs 1110, 1120, 1130, 1140, 1150, and 1160 indicate the classes of the defocus amounts in the backgrounds 810, 820, 830, 840, 850, and 860, respectively. Reference signs 1111, 1121, 1131, 1141, 1151, and 1161 indicate the classes of the defocus amounts in the subjects 811, 821, 831, 841, 851, and 861, respectively. Reference signs 1112 to 1117 indicate the classes of the defocus amounts in the poles 812 to 817, respectively. Reference signs 1122, 1123, and 1152 indicate the classes of the defocus amounts in the triangle cones 822, 823, and 852, respectively. Reference signs 1132, 1133, and 1153 indicate the classes of the defocus amounts in the rings 832, 833, and 853 to be passed through the dog, respectively. Reference sign 1142 indicates the class of the defocus amounts in the cage 842 that is larger than the dog (the subject to be detected). Reference sign 1162 indicates the class of the defocus amounts in the cage 862 that is approximately the same in size as the dog (the subject to be detected).

As described above, in processing performed in step S904, the inside of the subject area is segmentalized in the optical axis direction (defocus direction) by categorizing the defocus amounts into classes (categorizing the range of the plurality of defocus amounts corresponding to the plurality of ranging points into a plurality of partial ranges).

Returning to FIG. 9, in step S905, the camera MPU 125 detects class areas corresponding to respective classes obtained in step S904 in the ranging area set in step S902. A class area is a group of pixels having defocus amounts that belong to a corresponding class. The positions of pixels inside a class area (inside a partial area) need not be continuous, and may be discrete.

FIGS. 12A to 12F are schematic explanatory diagrams of the class areas detected in step S905. FIGS. 12A, 12B, 12C, 12D, 12E, and 12F correspond to the ranging area 1010, the ranging area 1020, the ranging area 1030, the ranging area 1040, the ranging area 1050, and the ranging area 1060, respectively. Gray portions indicate the class areas corresponding to respective classes. As shown, the ranging area is categorized into a plurality of class areas (partial areas), and each of the plurality of class areas (partial areas) corresponds to a different one of the classes of the defocus amounts (a different one of partial ranges in the range of the plurality of defocus amounts corresponding to the plurality of ranging points).

Reference signs 1011, 1021, 1031, 1041, 1051, and 1061 indicate a range for standardizing evaluation values calculated in determining subject degrees, and this range is set as a range that is 13 times larger than the size of the subject area in both of the vertical and horizontal directions based on the central position of the subject area. In the examples of FIGS. 12A to 12F, $\beta=2$.

Reference signs 1210, 1220, 1230, 1240, 1250, and 1260 indicate class areas corresponding to the classes 1110, 1120, 1130, 1140, 1150, and 1160 corresponding to the backgrounds 810, 820, 830, 840, 850, and 860, respectively. Reference signs 1211, 1221, 1231, 1241, 1251, and 1261 indicate class areas corresponding to the classes 1111, 1121, 1131, 1141, 1151, and 1161 corresponding to the subjects 811, 821, 831, 841, 851, and 861, respectively. Reference signs 1212 to 1217 indicate class areas corresponding to the classes 1112 to 1117 corresponding to the poles 812 to 817, respectively. Reference signs 1222, 1223, and 1252 indicate class areas corresponding to the classes 1122, 1123, and 1152 corresponding to the triangle cones 822, 823, and 852, respectively. Reference signs 1232, 1233, and 1253 indicate class areas corresponding to the classes 1132, 1133, and 1153 corresponding to the rings 832, 833, and 853 to be passed through by the dog, respectively. Reference sign 1242 indicates a class area corresponding to the class 1142 corresponding to the cage 842 larger than the dog (the subject to be detected). Reference sign 1262 indicates a class area corresponding to the class 1162 corresponding to the cage 862 that is approximately the same in size as the dog (the subject to be detected).

In this way, in step S905, the class areas are detected (the ranging area is categorized into the plurality of class areas); this makes it possible to acknowledge how each of the classes of the defocus amounts is distributed inside the ranging area.

Returning to FIG. 9, in step S906, based on the subject area obtained in step S901 and respective class areas detected in step S905, the camera MPU 125 determines, for each class area, a subject degree indicating the possibility of existence of the subject to be detected. The determination of the subject degree in each class area is made based on, for example, geometric relationships (in the following example, a positional relationship and a size relationship) between each class area and the subject area. Alternatively, the determination of the subject degree in each class area may be made based on the shape of each class area in addition to the geometric relationships.

Figure 15:
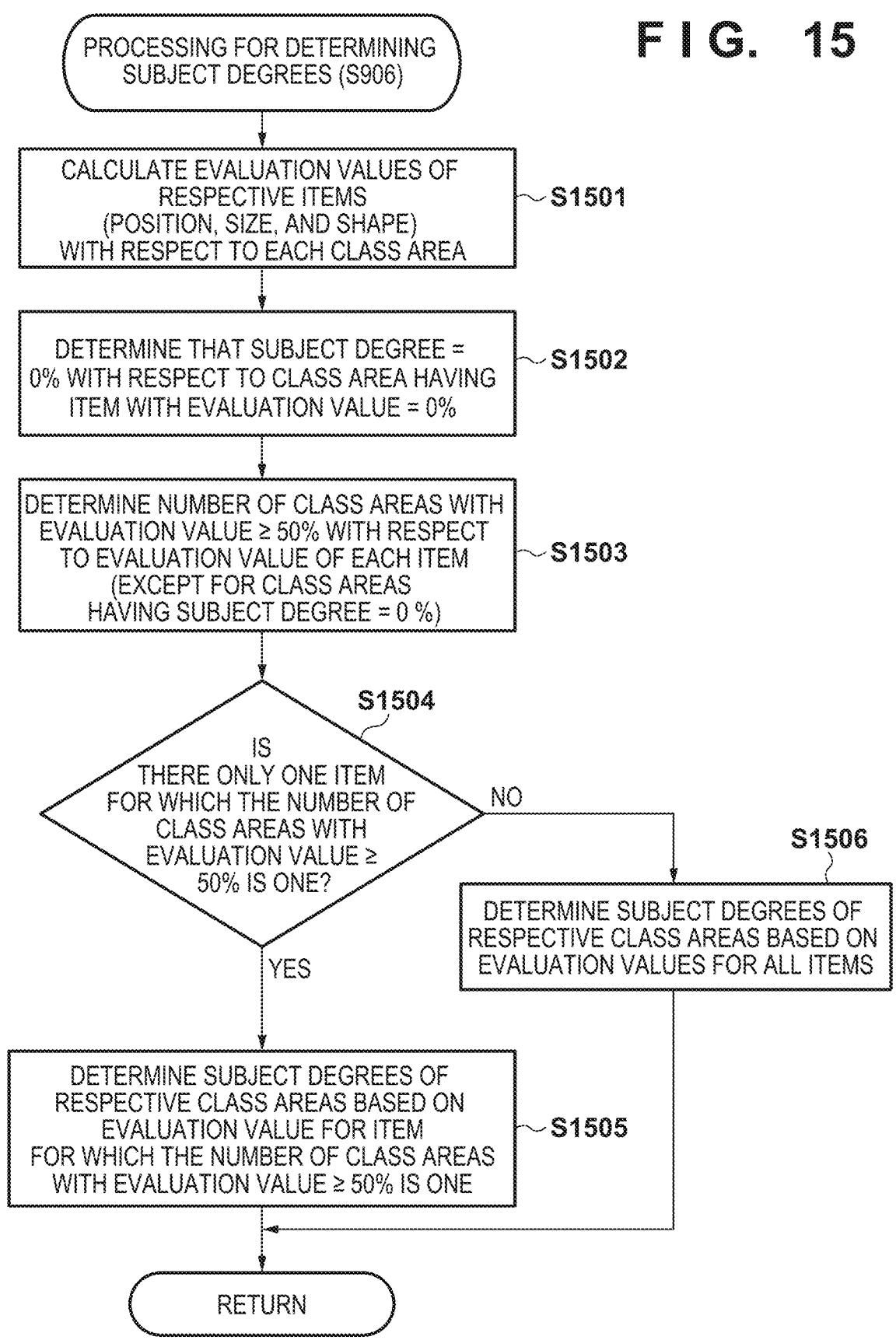
FIG. 15 is a flowchart showing the details of processing for determining a subject degree in step S906 of FIG. 9.

Processing for determining the subject degree will be described with reference to FIG. 15. Note that the processing of FIG. 15 is executed by the camera MPU 125.

In step S1501, for each class area, the camera MPU 125 calculates evaluation values of items including the position, the size, and the shape, respectively. The evaluation values of respective items (position: E1, size: E2, shape: E3) are calculated using the following formulae. In the following formulae, the position of the center of mass of a class area is denoted as $(x_c, y_c)$, the size of a class area (the maximum x coordinate, the maximum y coordinate) standardized based on the size of the subject area is denoted as ($w_c$, $h_c$), and the surface area of a class area is denoted as $S_c$. Note that the position of the center of mass of a class area, ($x_c$, $y_c$), is a position relative to the central position of the subject area, and has been standardized so that the upper right corner and the lower left corner of the subject area are (1, 1) and (−1, −1), respectively.

[Formula 1]

$$E1 = \begin{cases} 1 - \dfrac{\sqrt{x_c^2 + y_c^2}}{\beta}, & \sqrt{x_c^2 + y_c^2} < \beta \\ 0, & \sqrt{x_c^2 + y_c^2} \geq \beta \end{cases} \quad (1)$$

[Formula 2]

$$E2 = \begin{cases} E2_h, & E2_h \leq E2_w \\ E2_w, & E2_w < E2_h \end{cases} \quad (2)$$

$$E2_h = \begin{cases} h_c, & h_c \leq 1 \\ 1 - \dfrac{h_c - 1}{\beta - 1}, & 1 < h_c < \beta \\ 0, & \beta \leq h_c \end{cases} \quad (2h)$$

$$E2_w = \begin{cases} w_c, & w_c \leq 1 \\ 1 - \dfrac{w_c - 1}{\beta - 1}, & 1 < w_c < \beta \\ 0, & \beta \leq w_c \end{cases} \quad (2w)$$

[Formula 3]

$$E3 = \dfrac{S_c}{w_c h_c} \quad (3)$$

The evaluation value E1 of the position becomes close to 1 (100%) as the position of the center of mass of the class area, ($x_c$, $y_c$), approaches the central position of the subject area, and becomes close to 0 (0%) as the position of the center of mass of the class area becomes distanced from the central position of the subject area. The evaluation value E1 becomes 0 (0%) when the distance between the central position of the subject area and the position of the center of mass of the class area, ($x_c$, $y_c$), exceeds β used in the standardization of the evaluation value. In the case of the example of FIG. 12A, the evaluation value E1 becomes 0 (0%) when the position of the center of mass of the class area, ($x_c$, $y_c$), does not fall within an inscribed circle of the standardization range 1011.

The evaluation value E2 of the size becomes close to 1 (100%) as the size of the class area, ($w_c$, $h_c$), approaches the size of the subject area, becomes close to 0 (0%) as the size of the class area deviates from the size of the subject area, and becomes 0 (0%) when the size of the subject area exceeds β used in the standardization of the evaluation value. Also, the evaluation value E2 is calculated using one of ($w_c$, $h_c$) that has a larger difference from the size of the subject area.

The evaluation value E3 of the shape indicates the density of a class area inside a quadrilateral area that represents an escribed area of a class area; it becomes close to 1 (100%) as the density increases, and becomes close to 0 (0%) as the density decreases.

Next, in step S1502, the camera MPU 125 refers to the evaluation values E1 to E3 of each class area calculated in step S1501, and determines that the subject degree is 0% with respect to a class area having an item with an evaluation value=0%. Therefore, for example, if a class area has at least one item with an evaluation value of 0%, as in the case of (E1=93%, E2=0%, E3=88%), it is determined that the possibility of the class area being the subject to be detected is practically zero, regardless of the evaluation values of other items.

In step S1503, with respect to the evaluation values of respective items, the camera MPU 125 determines the number of class areas with an evaluation value of 50% or more (except for the class areas that have already been determined to have a subject degree=0%).

In step S1504, the camera MPU 125 determines whether there is one item for which the number of class areas with an evaluation value of 50% or more is one. When there is one item that satisfies this condition, processing proceeds to step S1505; otherwise, processing proceeds to step S1506. The threshold for the evaluation values used in the determination of step S1504 is not limited to 50%, and another value (e.g., 60%) may be used as the threshold.

In step S1505, based on the evaluation values of the item for which the number of class areas with an evaluation value of 50% or more is one, the camera MPU 125 determines the subject degree of each class area (except for the class areas that have already been determined to have a subject degree=0%). For example, the camera MPU 125 uses the evaluation values of such an item as the subject degrees as is. When there is one item for which the number of class areas with an evaluation value of 50% or more is one, it is considered that the class area with an evaluation value of 50% or more for this item has a high possibility of being the subject to be detected, and thus the subject degrees are determined without using items other than this item.

In step S1506, based on the evaluation values of all items calculated in step S1501, the camera MPU 125 determines the subject degree of each class area (except for the class areas that have already been determined to have a subject degree=0%). For example, the camera MPU 125 uses an average value of the evaluation values of all items as the subject degree. Alternatively, the camera MPU 125 may determine the subject degree by weighting the evaluation values of all items and averaging the weighted evaluation values. Weighting may be set based on the preset degrees of importance of respective items, a weight for an item that has a large difference from other items in terms of evaluation values may be increased, or a large weight may be set for an item with large evaluation values.

A description is now given of a specific example of processing for determining the subject degrees with respect to the class areas that respectively correspond to the subject areas 801 to 806 with reference to FIGS. 12A to 12F and FIG. 15.

Figure 12A:
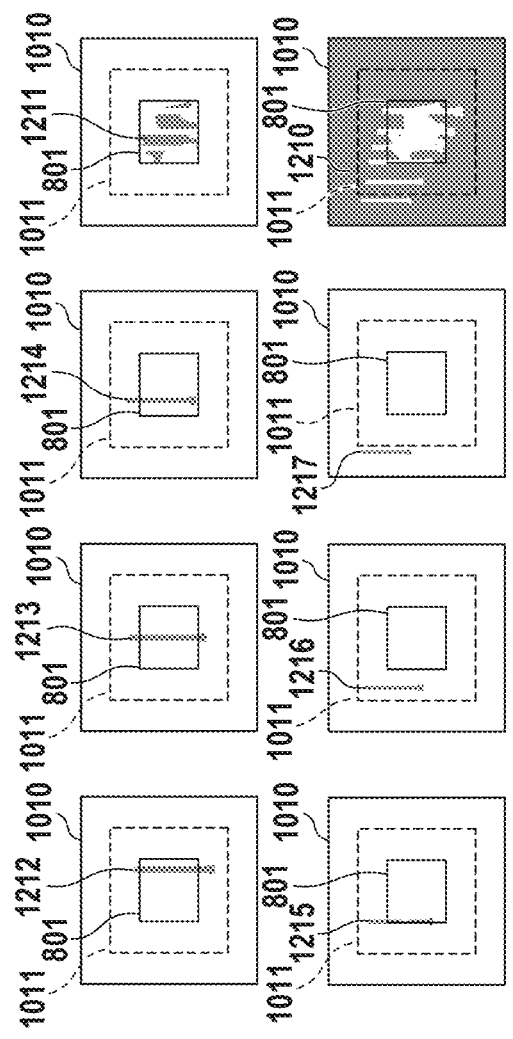
FIGS. 12A to 12F are schematic explanatory diagrams of class areas detected in step S905.

First, processing for determining the subject degrees with respect to the class areas of the subject area 801 will be described with reference to FIG. 12A. Table 2 indicates the position and the size of each class area that have been standardized based on the position and the size of the subject area 801, the evaluation values of respective items that have been calculated with respect to each class area in step S1501, and the subject degree of each class area.

TABLE 2

| CLASS AREA | POSITION | SIZE | EVALUATION VALUE POSITION | SIZE | SHAPE | SUBJECT DEGREE |
|---|---|---|---|---|---|---|
| 1210 | (0.8, 0.1) | (3, 3) | 60% | 0% | 90% | 0% |
| 1211 | (−0.1, 0.1) | (0.95, 0.95) | 93% | 95% | 30% | 95% |
| 1212 | (0.8, −0.25) | (0.1, 1.4) | 58% | 10% | 90% | 10% |
| 1213 | (0, 0) | (0.09, 1.25) | 100% | 9% | 90% | 9% |
| 1214 | (−0.5, 0.6) | (0.08, 1.2) | 61% | 8% | 90% | 8% |
| 1215 | (−0.95, 0.7) | (0.07, 1.15) | 41% | 7% | 90% | 7% |
| 1216 | (−1.6, 0.75) | (0.06, 1) | 12% | 6% | 90% | 6% |
| 1217 | (2.2, 1.15) | (0.05, 0.9) | 0% | 5% | 90% | 0% |

In Table 2, the evaluation value of the size of the class area 1210 is 0%, and the evaluation value of the position of the class area 1217 is 0%. Therefore, in step S1502, the subject degrees of the class area 1210 and the class area 1217 are determined to be 0%.

Processing of step S1503 onward is performed with respect to the class areas 1211 to 1216 for which the subject degrees have not been determined yet. Regarding the evaluation values of the position and the shape, the number of class areas with an evaluation value of 50% or more is two or more. Regarding the evaluation values of the size, the number of class areas with an evaluation value of 50% or more is one (the class area 1211). Thus, there is one item for which the number of class areas with an evaluation value of 50% or more is one (the evaluation value of the size). Therefore, with regard to the class areas 1211 to 1216, the evaluation values of the size are determined to be the subject degrees in step S1505.

In this way, the subject degree of the class area 1211 corresponding to the subject to be detected can be correctly determined to be high.

Figure 12B:
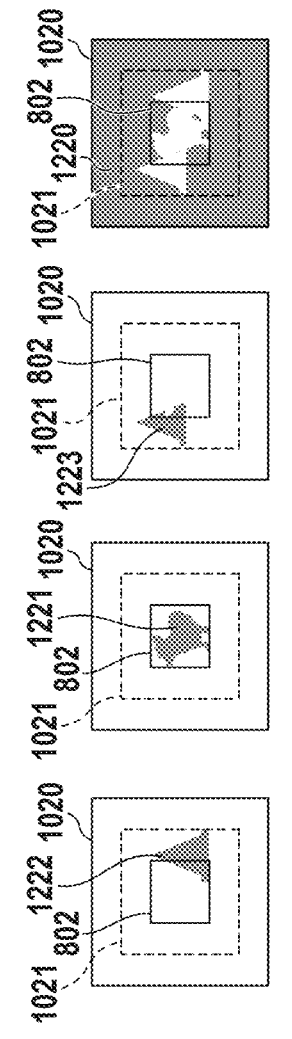

Next, processing for determining the subject degree with respect to the class areas of the subject area 802 will be described with reference to FIG. 12B. Table 3 indicates the position and the size of each class area that have been standardized based on the position and the size of the subject area 802, the evaluation values of respective items that have been calculated with respect to each class area in step S1501, and the subject degree of each class area.

TABLE 3

| CLASS AREA | POSITION | SIZE | EVALUATION VALUE POSITION | SIZE | SHAPE | SUBJECT DEGREE |
|---|---|---|---|---|---|---|
| 1220 | (−0.1, 0.1) | (3, 3) | 93% | 0% | 88% | 0% |
| 1221 | (−0.25, 0.1) | (0.8, 0.95) | 87% | 80% | 45% | 87% |

TABLE 3-continued

| CLASS AREA | POSITION | SIZE | EVALUATION VALUE POSITION | SIZE | SHAPE | SUBJECT DEGREE |
|---|---|---|---|---|---|---|
| 1222 | (1.25, −0.2) | (0.8, 0.95) | 37% | 80% | 45% | 37% |
| 1223 | (−1.25, 0.75) | (0.75, 0.9) | 27% | 75% | 45% | 27% |

In Table 3, the evaluation value of the size of the class area 1220 is 0%. Therefore, in step S1502, the subject degree of the class area 1220 is determined to be 0%.

Processing of step S1503 onward is performed with respect to the class areas 1221 to 1223 for which the subject degrees have not been determined yet. Regarding the evaluation values of the size, the number of class areas with an evaluation value of 50% or more is two or more. Regarding the evaluation values of the shape, there is no class area with an evaluation value of 50% or more. Regarding the evaluation values of the position, the number of class areas with an evaluation value of 50% or more is one (the class area 1221). Thus, there is one item for which the number of class areas with an evaluation value of 50% or more is one (the evaluation value of the position). Therefore, with regard to the class areas 1221 to 1223, the evaluation values of the position are determined to be the subject degrees in step S1505.

In this way, the subject degree of the class area 1221 corresponding to the subject to be detected can be correctly determined to be high.

Figure 12C:
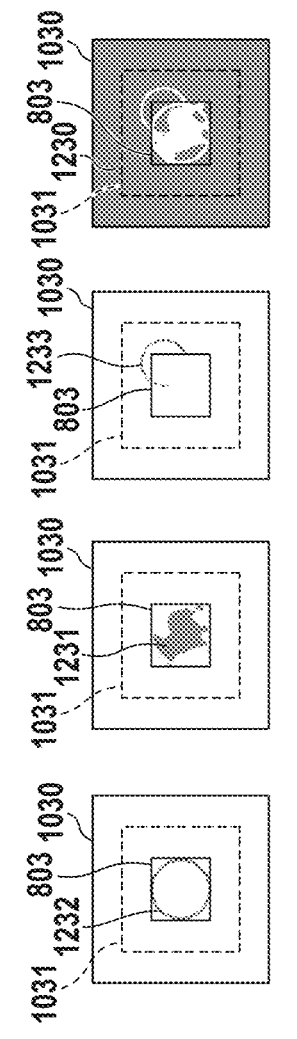

Next, processing for determining the subject degrees with respect to the class areas of the subject area 803 will be described with reference to FIG. 12C. Table 4 indicates the position and the size of each class area that have been standardized based on the position and the size of the subject area 803, the evaluation values of respective items that have been calculated with respect to each class area in step S1501, and the subject degree of each class area.

TABLE 4

| CLASS AREA | POSITION | SIZE | EVALUATION VALUE POSITION | SIZE | SHAPE | SUBJECT DEGREE |
|---|---|---|---|---|---|---|
| 1230 | (−0.1, −0.1) | (3, 3) | 93% | 0% | 90% | 0% |
| 1231 | (−0.1, 0.1) | (0.95, 0.95) | 93% | 95% | 60% | 60% |
| 1232 | (0, 0) | (0.95, 0.95) | 100% | 95% | 10% | 10% |
| 1233 | (0.7, 0.7) | (0.8, 0.8) | 51% | 80% | 5% | 5% |

In Table 4, the evaluation value of the size of the class area 1230 is 0%. Therefore, in step S1502, the subject degree of the class area 1230 is determined to be 0%.

Processing of step S1503 onward is performed with respect to class areas 1231 to 1233 for which the subject degrees have not been determined yet. Regarding the evaluation values of the position and the size, the number of class areas with an evaluation value of 50% or more is two or more. Regarding the evaluation values of the shape, the number of class areas with an evaluation value of 50% or more is one (the class area 1231). Thus, there is one item for which the number of class areas with an evaluation value of 50% or more is one (the evaluation value of the shape). Therefore, with regard to the class areas 1231 to 1233, the evaluation values of the shape are determined to be the subject degrees in step S1505.

In this way, the subject degree of the class area 1231 corresponding to the subject to be detected can be correctly determined to be high.

Figure 12D:
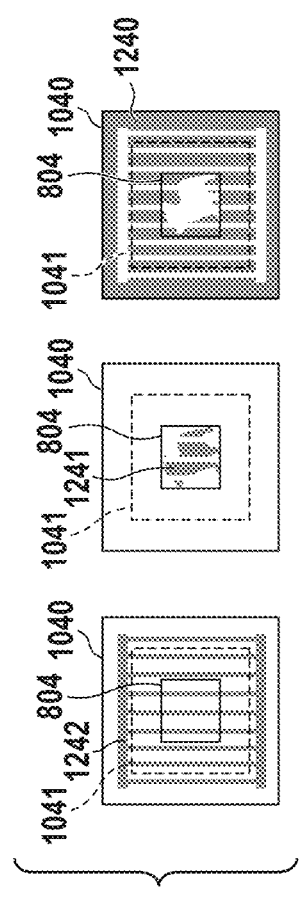

Next, processing for determining the subject degrees with respect to the class areas of the subject area 804 will be described with reference to FIG. 12D. Table 5 indicates the position and the size of each class area that have been standardized based on the position and the size of the subject area 804, the evaluation values of respective items that have been calculated with respect to each class area in step S1501, and the subject degree of each class area.

TABLE 5

| CLASS AREA | POSITION | SIZE | EVALUATION VALUE | | | SUBJECT DEGREE |
|---|---|---|---|---|---|---|
| | | | POSITION | SIZE | SHAPE | |
| 1240 | (0, 0) | (3, 3) | 100% | 0% | 70% | 0% |
| 1241 | (0.1, −0.1) | (0.9, 0.9) | 93% | 90% | 40% | 74% |
| 1242 | (−0.1, 0.1) | (2.5, 2.5) | 93% | 0% | 40% | 0% |

In Table 5, the evaluation values of the sizes of the class area 1240 and the class area 1242 are 0%. Therefore, in step S1502, the subject degrees of the class area 1240 and the class area 1242 are determined to be 0%.

Processing of step S1503 onward is performed with respect to the class area 1241 for which the subject degree has not been determined yet. Regarding the evaluation values of the shape, there is no class area with an evaluation value of 50% or more. Regarding the evaluation values of the position and the size, the number of class areas with an evaluation value of 50% or more is one (the class area 1241). Thus, there are two items for which the number of class areas with an evaluation value of 50% or more is one (the evaluation values of the position and the size). Therefore, with regard to the class area 1241, an average value of the evaluation values of all items is determined to be the subject degree in step S1505.

In this way, the subject degree of the class area 1241 corresponding to the subject to be detected can be correctly determined to be high.

Figure 12E:
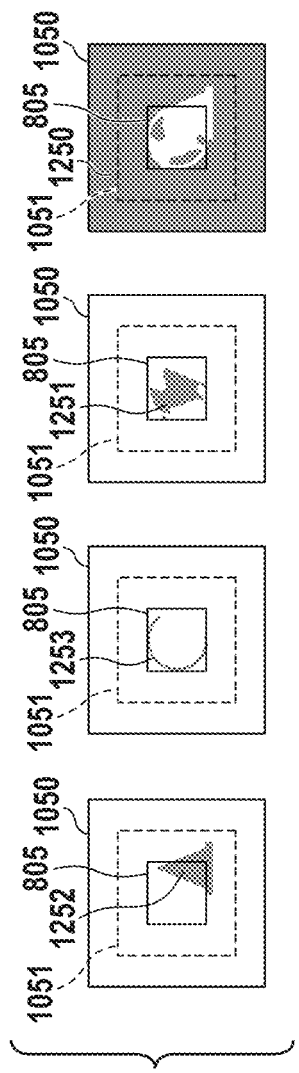

Next, processing for determining the subject degrees with respect to the class areas of the subject area 805 will be described with reference to FIG. 12E. Table 6 indicates the position and the size of each class area that have been standardized based on the position and the size of the subject area 805, the evaluation values of respective items that have been calculated with respect to each class area in step S1501, and the subject degree of each class area.

TABLE 6

| CLASS AREA | POSITION | SIZE | EVALUATION VALUE | | | SUBJECT DEGREE |
|---|---|---|---|---|---|---|
| | | | POSITION | SIZE | SHAPE | |
| 1250 | (−0.75, 0.2) | (3, 3) | 61% | 0% | 90% | 0% |
| 1251 | (−0.25, 0.1) | (0.8, 0.95) | 87% | 80% | 45% | 71% |
| 1252 | (0.75, −0.2) | (0.8, 0.95) | 61% | 80% | 45% | 62% |
| 1253 | (0, 0) | (0.95, 0.95) | 100% | 95% | 7% | 67% |

In Table 6, the evaluation value of the size of the class area 1250 is 0%. Therefore, in step S1502, the subject degree of the class area 1250 is determined to be 0%.

Processing of step S1503 onward is performed with respect to the class areas 1251 to 1253 for which the subject degrees have not been determined yet. Regarding the evaluation values of the position and the size, the number of class areas with an evaluation value of 50% or more is two or more. Regarding the evaluation values of the shape, there is no class areas with an evaluation value of 50% or more. Thus, there is no item for which the number of class areas with an evaluation value of 50% or more is one. Therefore, with regard to the class areas 1251 to 1253, an average value of the evaluation values of all items is determined to be the subject degree in step S1505.

In this way, the subject degree of the class area 1251 corresponding to the subject to be detected can be correctly determined to be high.

Figure 12F:
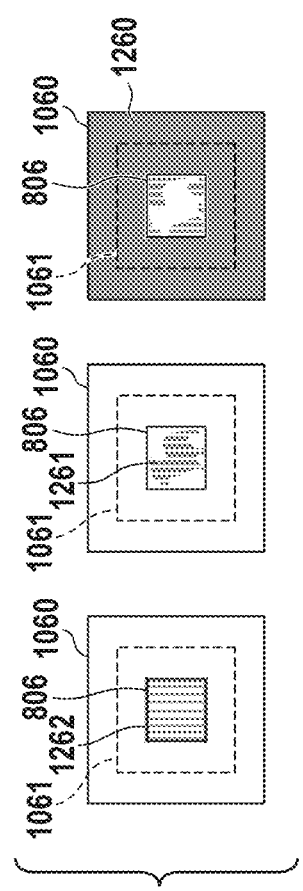

Next, processing for determining the subject degrees with respect to the class areas of the subject area 806 will be described with reference to FIG. 12F. Table 7 indicates the position and the size of each class area that have been standardized based on the position and the size of the subject area 806, the evaluation values of respective items that have been calculated with respect to each class area in step S1501, and the subject degree of each class area.

TABLE 7

| CLASS AREA | POSITION | SIZE | EVALUATION VALUE | | | SUBJECT DEGREE |
|---|---|---|---|---|---|---|
| | | | POSITION | SIZE | SHAPE | |
| 1260 | (0, 0) | (3, 3) | 100% | 0% | 90% | 0% |
| 1261 | (0.1, −0.1) | (0.95, 0.95) | 93% | 95% | 60% | 83% |
| 1262 | (0, 0) | (0.95, 0.95) | 100% | 95% | 53% | 83% |

In Table 7, the evaluation value of the size of the class area 1260 is 0%. Therefore, in step S1502, the subject degree of the class area 1260 is determined to be 0%.

Processing of step S1503 onward is performed with respect to class areas 1261 and 1262 for which the subject degrees have not been determined yet. The number of class areas that have an evaluation value of 50% or more for every item is two or more. Thus, there is no item for which the number of class areas with an evaluation value of 50% or more is one. Therefore, with regard to the class areas 1261 and 1262, an average value of the evaluation values of all items is determined to be the subject degree in step S1505.

In this way, the subject degree of the class area 1261 corresponding to the subject to be detected can be correctly determined to be high.

Determining a subject degree in the foregoing manner enables highly accurate identification of a class area corresponding to a subject to be detected, even in a case where a subject that is not to be detected exists inside a subject area. Note that although a subject degree of a class area has been determined in the foregoing description, a subject degree of a class to which a class area belongs may be determined.

Returning to FIG. 9, in step S907, the phase detection AF unit 129 selects a ranging point based on the subject degrees determined in step S906. When the class area with the highest subject degree includes therein ranging points with ranging results that have reliability (reliability of defocus amounts) higher than a predetermined threshold, the phase detection AF unit 129 selects a ranging point close to the center of the subject area from among such ranging points. In other words, the phase detection AF unit 129 selects, from among a plurality of defocus amounts (a first plurality of defocus amounts) corresponding to a plurality of ranging points inside a class area with the highest subject degree, a first defocus amount with a reliability degree equal to or higher than a reliability degree threshold (e.g., a defocus amount of a ranging point close to the center of the subject area).

When the class area with the highest subject degree does not include therein a ranging point with reliability higher than the predetermined threshold, the phase detection AF unit 129 makes the selection in a class area with the second highest subject degree. That is to say, when the class area with the second highest subject degree includes therein ranging points with reliability higher than the predetermined threshold, the phase detection AF unit 129 selects a ranging point close to the center of the subject area from among such ranging points. In other words, the phase detection AF unit 129 selects, from among a plurality of defocus amounts (a second plurality of defocus amounts) corresponding to a plurality of ranging points inside a class area with the second highest subject degree next to the highest subject degree, a second defocus amount with a reliability degree equal to or higher than the reliability degree threshold (e.g., a defocus amount of a ranging point close to the center of the subject area).

When the class area with the second highest subject degree does not include therein a ranging point with reliability higher than the predetermined threshold, a ranging point (defocus amount) is selected thereafter in a similar manner from class areas with the third and subsequent highest subject degrees.

When there are a plurality of class areas with the same subject degree, the phase detection AF unit 129 selects a ranging point from a non-closest class area. In a situation where a plurality of class areas have the same subject degree, there is a high possibility that an obstacle and the like exist in front of the subject to be detected (on the closest side), and because it is considered that the closest class area has a high possibility of corresponding to the obstacle, a degree of priority of the closest class area is lowered in the selection of a ranging point. Also, when there are a plurality of class areas which are non-closest class areas and which have the same subject degree, the phase detection AF unit 129 searches for a selectable ranging point (a ranging point with reliability higher than the predetermined threshold) in order from a class area in which a representative defocus amount of its class is close to the closest side.

Selecting a ranging point from an area with a high subject degree in the foregoing manner makes it possible to select a ranging point in an area that has a high probability of being a subject to be detected. Therefore, even in a case a subject that is not to be detected is included inside a subject area, appropriate focus control can be performed with respect to a subject to be detected.

In step S908, the phase detection AF unit 129 calculates a focus lens driving amount based on the defocus amount detected at the ranging point selected in step S908. Note that according to the description of steps S907 and S908, it is assumed that a ranging point close to the center of the subject area is selected from among ranging points with reliability higher than the predetermined threshold in a class area with a high subject degree, and the defocus amount of the selected ranging point is used. However, the present embodiment is not limited to this configuration, and a representative defocus amount of a class to which a class area with a high subject degree belongs may be used. The representative defocus amount is, for example, an average defocus amount or a central defocus amount of the class.

In step S909, the phase detection AF unit 129 performs control for driving the focus lens 104 based on the focus lens driving amount calculated in step S908.

Details of White Balance Adjustment Processing in Step S705

Figure 13:
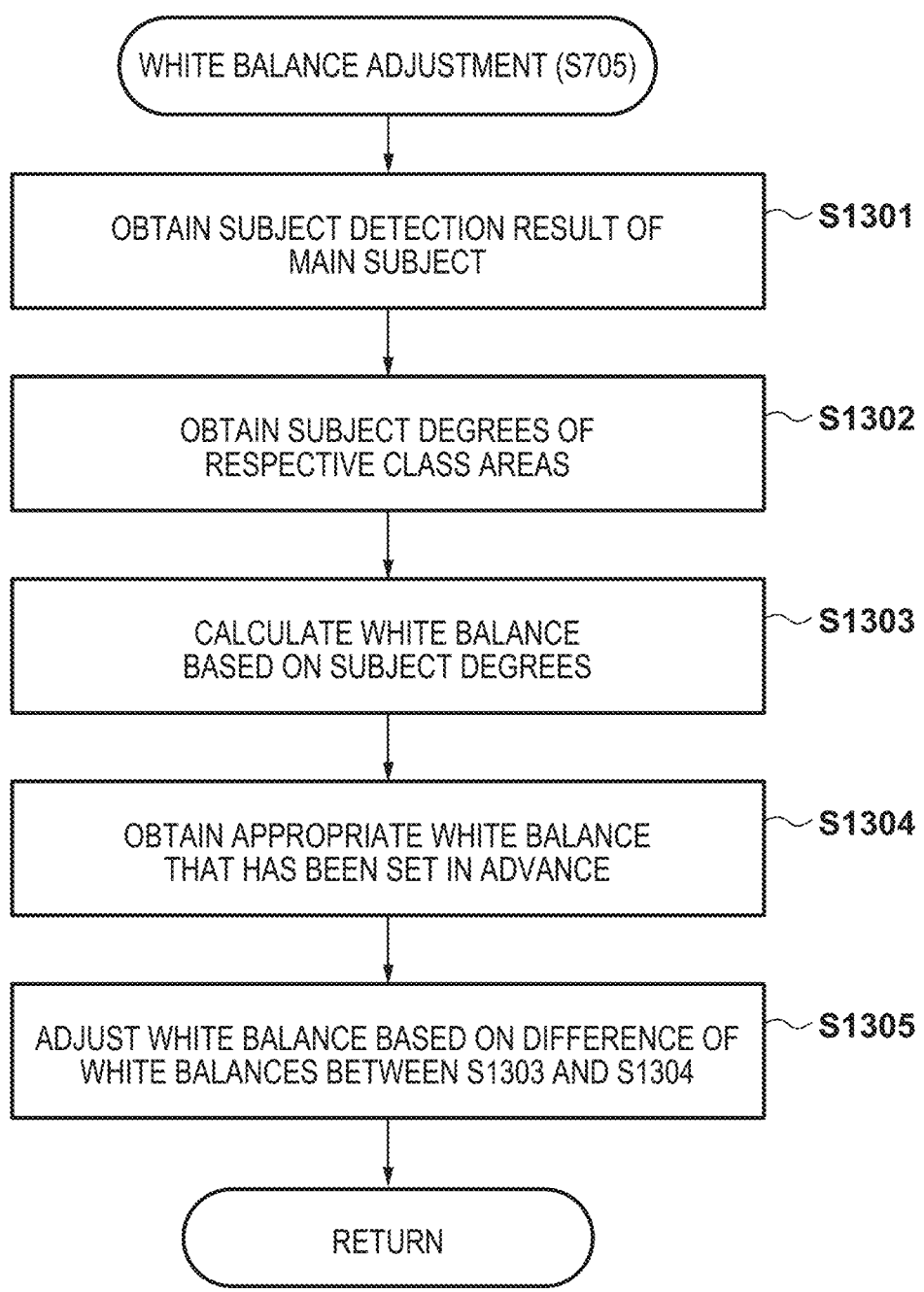
FIG. 13 is a flowchart showing the details of white balance adjustment processing in step S705 of FIG. 7.

FIG. 13 is a flowchart showing the details of white balance adjustment processing in step S705 of FIG. 7. Note that the processing of FIG. 13 is executed by the white balance adjustment unit 131 controlled by the camera MPU 125.

In step S1301, the white balance adjustment unit 131 obtains the subject detection result (subject area) of the main subject detected in steps S701 and S702.

In step S1302, the white balance adjustment unit 131 obtains the subject degrees of respective class areas determined in step S906.

In step S1303, the white balance adjustment unit 131 calculates white balance based on the subject degrees of respective class areas obtained in step S1302. The white balance adjustment unit 131 calculates white balance for each class area, and calculates the current white balance by weighting the white balance of each class area based on the subject degrees obtained in step S1302. The values of the subject degrees may be used as is as the weights used in the calculation of white balance. Therefore, the white balance adjustment (white balance control) mentioned here includes computation whereby each of the plurality of class areas is regarded as a target class area and the pixel values of the target class area are weighted based on the subject degree of the target class area. Shooting control based on such computation involving weighting can be similarly applied also to the aforementioned focus adjustment (focus control) and later-described exposure adjustment (exposure control).

Note that a method of calculation of white balance is not limited in a particular way; for example, the white balance adjustment unit 131 may calculate white balance of a class area with the highest subject degree as the current white balance. In other words, the white balance adjustment unit 131 may perform white balance control based solely on a class area that has the highest subject degree among the plurality of class areas. Shooting control based solely on such a class area with the highest subject degree can be similarly applied also to the aforementioned focus adjustment (focus control) and later-described exposure adjustment (exposure control).

Furthermore, in a case where there are a plurality of class areas with the same subject degree, if the plurality of class areas include the closest class area, the smallest weight may be set for the closest class area among the plurality of class areas, and with regard to the remaining class areas, a larger weight may be set for a closer class area.

In step S1304, the white balance adjustment unit 131 obtains appropriate white balance that has been set in advance.

In step S1305, the white balance adjustment unit 131 computes the difference between the current white balance calculated in step S1303 and the appropriate white balance obtained in step S1304, and adjusts white balance with respect to captured image data (a captured image signal).

Details of Exposure Adjustment Processing in Step S706

Figure 14:
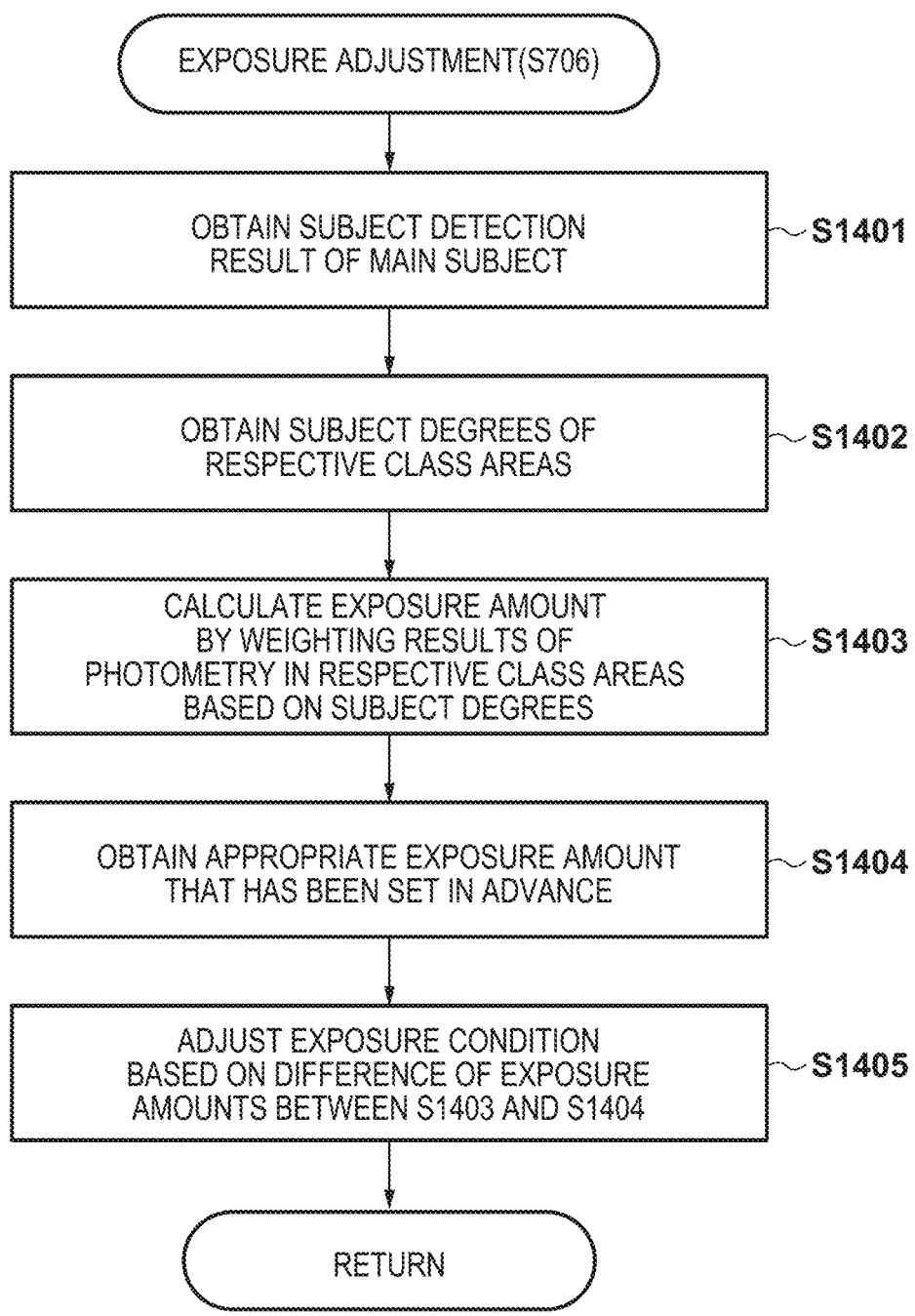
FIG. 14 is a flowchart showing the details of exposure adjustment processing in step S706 of FIG. 7.

FIG. 14 is a flowchart showing the details of exposure adjustment processing in step S706 of FIG. 7. Note that the processing of FIG. 14 is executed by the AE unit 130 controlled by the camera MPU 125.

In step S1401, the AE unit 130 obtains the subject detection result (subject area) of the main subject detected in steps S701 and S702.

In step S1402, the AE unit 130 obtains the subject degrees of respective class areas determined in step S906.

In step S1403, the AE unit 130 calculates an exposure amount by weighting the results of photometry in respective class areas based on the subject degrees of respective class areas obtained in step S1402. The weights used in calculation of the exposure amount may be 1 and 0, respectively, for a class area with the highest subject degree and for other class areas. Furthermore, in a case where there are a plurality of class areas with the same subject degree, if the plurality of class areas include the closest class area, the smallest weight may be set for the closest class area among the plurality of class areas, and with regard to the remaining class areas, a larger weight may be set for a closer class area. Furthermore, the same weights or different weights may be used for calculation of white balance (step S1303) and calculation of the exposure amount (step S1403).

In step S1404, the AE unit 130 obtains an appropriate exposure amount that has been set in advance.

In step S1405, the AE unit 130 computes the difference between the exposure amount calculated in step S1403 and the exposure amount obtained in step S1404, and adjusts exposure conditions at the time of shooting.

As described above, according to the first embodiment, the image capturing apparatus 10 detects a subject area that partially includes a subject to be detected in a shooting range, and obtains a plurality of defocus amounts corresponding to a plurality of ranging points inside a ranging area including the subject area. Then, the image capturing apparatus 10 categorizes the ranging area into a plurality of class areas based on the plurality of defocus amounts. Each of the plurality of class areas corresponds to a different one of the classes of the defocus amounts (a different one of partial ranges in the range of the plurality of defocus amounts). The image capturing apparatus 10 determines a subject degree with respect to each of the plurality of class areas based on geometric relationships (e.g., at least one of a positional relationship and a size relationship) between each of the plurality of class areas and the subject area. Then, the image capturing apparatus 10 performs shooting control based on the plurality of class areas so that the contribution of a class area with a first subject degree is larger than the contribution of a class area with a second subject degree that is lower than the first subject degree. Specific examples of such shooting control include focus adjustment (focus control) shown in FIG. 9, white balance adjustment (white balance control) shown in FIG. 13, exposure adjustment (exposure control) shown in FIG. 14, and so forth; however, shooting control of the present embodiment is not limited to these specific examples.

Due to the foregoing configuration, the present embodiment can improve the accuracy of shooting control based on a subject detection area that partially includes a subject to be detected.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-084791, filed May 13, 2020 which is hereby incorporated by reference herein in its entirety.

What is claimed is:

1. An apparatus, comprising:
   at least one processor; and
   a memory that stores a program which, when executed by the at least one processor, causes the at least one processor to function as:
   a detection unit configured to detect, in a shooting range, a subject area that includes a first portion in which a subject to be detected exists and a second portion in which the subject to be detected does not exist;

an obtainment unit configured to obtain a plurality of defocus amounts corresponding to a plurality of ranging points inside a ranging area that includes the subject area, wherein the plurality of ranging points comprises a first ranging point within the first portion of the subject area and a second ranging point within the second portion of the subject area;

a categorization unit configured to categorize the ranging area into a plurality of partial areas based on the plurality of defocus amounts, each of the plurality of partial areas corresponding to a different one of partial ranges in a range of the plurality of defocus amounts, wherein the first ranging point within the first portion of the subject area belongs to a first partial area of the plurality of partial areas;

a determination unit configured to determine a subject degree with respect to each of the plurality of partial areas based on geometric relationships between each of the plurality of partial areas and the subject area, the subject degree indicating a possibility that the subject to be detected exists; and a control unit configured to perform shooting control based on the plurality of partial areas, the shooting control being performed so that a contribution of a partial area with a first subject degree is larger than a contribution of a partial area with a second subject degree that is lower than the first subject degree.

2. The apparatus according to claim 1, wherein the geometric relationships between each of the plurality of partial areas and the subject area include at least one of a positional relationship and a size relationship.

3. The apparatus according to claim 1, wherein the determination unit determines the subject degree of each of the plurality of partial areas based on a shape of each of the plurality of partial areas, in addition to the geometric relationships between each of the plurality of partial areas and the subject area.

4. The apparatus according to claim 1, wherein the determination unit
calculates first evaluation values respectively for the plurality of partial areas based on the positional relationship between each of the plurality of partial areas and the subject area,
calculates second evaluation values respectively for the plurality of partial areas based on the size relationship between each of the plurality of partial areas and the subject area,
calculates third evaluation values respectively for the plurality of partial areas based on respective shapes of the plurality of partial areas, and
determines the subject degree of each of the plurality of partial areas based on the first evaluation value, the second evaluation value, and the third evaluation value of each of the plurality of partial areas.

5. The apparatus according to claim 1, wherein the ranging area is larger than the subject area and includes an entirety of the subject area.

6. The apparatus according to claim 1, wherein the control unit performs the shooting control based solely on a partial area that has a highest subject degree among the plurality of partial areas.

7. The apparatus according to claim 1, wherein the shooting control includes computation whereby each of the plurality of partial areas is regarded as a target partial area and pixel values of the target partial area are weighted based on the subject degree of the target partial area.

8. The apparatus according to claim 1, wherein the shooting control is focus control, white balance control, or exposure control.

9. The apparatus according to claim 1, wherein the shooting control is focus control, and
the control unit
selects a first defocus amount with a reliability degree equal to or higher than a reliability degree threshold from among a first plurality of defocus amounts corresponding to a plurality of ranging points inside a partial area that has a highest subject degree among the plurality of partial areas, and
performs the focus control based on the first defocus amount.

10. The apparatus according to claim 9, wherein when the first plurality of defocus amounts do not include a defocus amount with a reliability degree equal to or higher than the reliability degree threshold, the control unit
selects a second defocus amount with a reliability degree equal to or higher than the reliability degree threshold from among a second plurality of defocus amounts corresponding to a plurality of ranging points inside a partial area that has a second highest subject degree, next to the highest subject degree, among the plurality of partial areas, and
performs the focus control based on the second defocus amount.

11. An image capturing apparatus, comprising:
the apparatus according to claim 1; and
an image sensor.

12. The image capturing apparatus according to claim 11, wherein the geometric relationships between each of the plurality of partial areas and the subject area include at least one of a positional relationship and a size relationship.

13. A method executed by an apparatus, comprising:
detecting, in a shooting range, a subject area that includes a first portion in which a subject to be detected exists and a second portion in which the subject to be detected does not exist;
obtaining a plurality of defocus amounts corresponding to a plurality of ranging points inside a ranging area that includes the subject area, wherein the plurality of ranging points comprises a first ranging point within the first portion of the subject area and a second ranging point within the second portion of the subject area;
categorizing the ranging area into a plurality of partial areas based on the plurality of defocus amounts, each of the plurality of partial areas corresponding to a different one of partial ranges in a range of the plurality of defocus amounts, wherein the first ranging point within the first portion of the subject area belongs to a first partial area of the plurality of partial areas;
determining a subject degree with respect to each of the plurality of partial areas based on geometric relationships between each of the plurality of partial areas and the subject area, the subject degree indicating a possibility that the subject to be detected exists; and
performing shooting control based on the plurality of partial areas, the shooting control being performed so that a contribution of a partial area with a first subject degree is larger than a contribution of a partial area with a second subject degree that is lower than the first subject degree.

14. The method according to claim 13, wherein the geometric relationships between each of the plurality of partial areas and the subject area include at least one of a positional relationship and a size relationship.

15. The method according to claim 13, wherein the determining determines the subject degree of each of the plurality of partial areas based on a shape of each of the plurality of partial areas, in addition to the geometric relationships between each of the plurality of partial areas and the subject area.

16. The method according to claim 13, wherein the determining
- calculates first evaluation values respectively for the plurality of partial areas based on the positional relationship between each of the plurality of partial areas and the subject area,
- calculates second evaluation values respectively for the plurality of partial areas based on the size relationship between each of the plurality of partial areas and the subject area,
- calculates third evaluation values respectively for the plurality of partial areas based on respective shapes of the plurality of partial areas, and
- determines the subject degree of each of the plurality of partial areas based on the first evaluation value, the second evaluation value, and the third evaluation value of each of the plurality of partial areas.

17. A non-transitory computer-readable storage medium which stores a program for causing a computer to execute a method comprising:
- detecting, in a shooting range, a subject area that includes a first portion in which a subject to be detected exists and a second portion in which the subject to be detected does not exist;
- obtaining a plurality of defocus amounts corresponding to a plurality of ranging points inside a ranging area that includes the subject area, wherein the plurality of ranging points comprises a first ranging point within the first portion of the subject area and a second ranging point within the second portion of the subject area;
- categorizing the ranging area into a plurality of partial areas based on the plurality of defocus amounts, each of the plurality of partial areas corresponding to a different one of partial ranges in a range of the plurality of defocus amounts, wherein the first ranging point within the first portion of the subject area belongs to a first partial area of the plurality of partial areas;
- determining a subject degree with respect to each of the plurality of partial areas based on geometric relationships between each of the plurality of partial areas and the subject area, the subject degree indicating a possibility that the subject to be detected exists; and
- performing shooting control based on the plurality of partial areas, the shooting control being performed so that a contribution of a partial area with a first subject degree is larger than a contribution of a partial area with a second subject degree that is lower than the first subject degree.

18. The non-transitory computer-readable storage medium according to claim 17, wherein the geometric relationships between each of the plurality of partial areas and the subject area include at least one of a positional relationship and a size relationship.

19. The non-transitory computer-readable storage medium according to claim 17, wherein the determining determines the subject degree of each of the plurality of partial areas based on a shape of each of the plurality of partial areas, in addition to the geometric relationships between each of the plurality of partial areas and the subject area.

20. The non-transitory computer-readable storage medium according to claim 17, wherein the determining
- calculates first evaluation values respectively for the plurality of partial areas based on the positional relationship between each of the plurality of partial areas and the subject area,
- calculates second evaluation values respectively for the plurality of partial areas based on the size relationship between each of the plurality of partial areas and the subject area,
- calculates third evaluation values respectively for the plurality of partial areas based on respective shapes of the plurality of partial areas, and
- determines the subject degree of each of the plurality of partial areas based on the first evaluation value, the second evaluation value, and the third evaluation value of each of the plurality of partial areas.

21. The apparatus according to claim 1, wherein the second ranging point within the second portion of the subject area belongs to a second partial area, which is different from the first partial area, of the plurality of partial areas.

* * * * *